US012106288B2

United States Patent
Andral

(12) United States Patent
(10) Patent No.: US 12,106,288 B2
(45) Date of Patent: Oct. 1, 2024

(54) AUTHENTICATION SYSTEM AND METHOD

(71) Applicant: Visa International Service Association, San Francisco, CA (US)

(72) Inventor: Vladimir Andral, Bellevue, WA (US)

(73) Assignee: Visa International Service Association, San Francisco, CA (US)

( * ) Notice: Subject to any disclaimer, the term of this patent is extended or adjusted under 35 U.S.C. 154(b) by 85 days.

(21) Appl. No.: 17/983,938

(22) Filed: Nov. 9, 2022

(65) Prior Publication Data

US 2024/0152912 A1    May 9, 2024

(51) Int. Cl.
| | | |
|---|---|---|
| *G06Q 20/00* | (2012.01) | |
| *G06Q 20/10* | (2012.01) | |
| *G06Q 20/12* | (2012.01) | |
| *G06Q 20/36* | (2012.01) | |
| *G06Q 20/38* | (2012.01) | |
| *G06Q 20/40* | (2012.01) | |

(52) U.S. Cl.
CPC ......... *G06Q 20/3678* (2013.01); *G06Q 20/10* (2013.01); *G06Q 20/1235* (2013.01); *G06Q 20/3821* (2013.01); *G06Q 20/3829* (2013.01); *G06Q 20/389* (2013.01); *G06Q 20/401* (2013.01); *G06Q 2220/00* (2013.01)

(58) Field of Classification Search
CPC .............. G06Q 20/3678; G06Q 20/10; G06Q 20/1235; G06Q 20/3821; G06Q 20/3829; G06Q 20/389; G06Q 20/401; G06Q 2220/00
USPC .......................... 705/16, 21, 58; 380/44, 262
See application file for complete search history.

(56) References Cited

U.S. PATENT DOCUMENTS

| | | | |
|---|---|---|---|
| 10,491,389 B2 | 11/2019 | Girish et al. | |
| 10,672,215 B2* | 6/2020 | Dominguez | G06Q 20/40 |
| 11,055,707 B2 | 7/2021 | Lingappa | |
| 2017/0161734 A1 | 6/2017 | Bankston et al. | |
| 2018/0053182 A1 | 2/2018 | Mokhasi | |
| 2019/0220856 A1 | 7/2019 | Li et al. | |
| 2019/0333055 A1* | 10/2019 | Mohammed | H04L 9/3234 |
| 2020/0151682 A1 | 5/2020 | Hurry et al. | |
| 2020/0162264 A1 | 5/2020 | Zamani et al. | |

(Continued)

FOREIGN PATENT DOCUMENTS

| | | | |
|---|---|---|---|
| JP | 2021056984 A | * | 4/2021 |
| WO | 2022/039726 A1 | | 2/2022 |

OTHER PUBLICATIONS

Foreign Reference Included (Year: 2019).*

*Primary Examiner* — Dante Ravetti
(74) *Attorney, Agent, or Firm* — Kilpatrick Townsend & Stockton LLP

(57) ABSTRACT

A method includes a server computer receiving a request from a user to obtain a resource in a transaction using a cryptocurrency. The server computer determines that the transaction is to be made using the cryptocurrency. The server computer initiates an authentication request message to an access control server via a directory server. The access control server authenticates the user and generates an authentication indicator. The server computer receives an authentication response comprising the authentication indicator from the access control server. The server computer evaluates the authentication indicator. Responsive to evaluating the authentication indicator, the server computer can process the transaction using the cryptocurrency.

20 Claims, 10 Drawing Sheets

(56) References Cited

U.S. PATENT DOCUMENTS

| | | |
|---|---|---|
| 2021/0174350 A1 | 6/2021 | Hena |
| 2021/0241266 A1 | 8/2021 | Kamal et al. |
| 2022/0029816 A1 | 1/2022 | Zamani et al. |
| 2022/0198418 A1 | 6/2022 | Kang et al. |
| 2022/0374982 A1 | 11/2022 | Sliwka et al. |
| 2023/0045669 A1 | 2/2023 | Robotham |
| 2023/0325844 A1* | 10/2023 | Banerjee .............. G06Q 20/405 705/44 |

* cited by examiner

AUTHENTICATION SYSTEM AND METHOD

CROSS-REFERENCES TO RELATED APPLICATIONS

None.

BACKGROUND

Current cryptocurrency frameworks allow users perform transactions in decentralized networks. However, these cryptocurrency frameworks lack flexibility. For example, a transaction can typically only use a single type of cryptocurrency in a transaction.

A characteristic of some cryptocurrencies is that they are distributed and anonymous. However, this presents problems in that a seller does not know if the funds that they are receiving in a transaction are from a legitimate source. A user's account can be stolen and the seller cannot tell the difference between funds received from a user operating the user's account or a thief operating the user's account. The decentralized nature of blockchain and the fact that there are many different digital wallets, cryptocurrency networks, and non-fungible tokens make it difficult to verify a user's identity.

Embodiments of the disclosure address this problem and other problems individually and collectively.

SUMMARY

Embodiments are related to methods and systems for processing interactions and authenticating users.

One embodiment is related to a method comprising: receiving, by a server computer, a request from a user to obtain a resource in a transaction using a cryptocurrency; determining, by the server computer, that the transaction to be conducted using the cryptocurrency; initiating, by the server computer, an authentication request message to an access control server via a directory server, wherein the access control server authenticates the user and generates an authentication indicator; receiving, by the server computer from the access control server, an authentication response comprising the authentication indicator; evaluating, by the server computer, the authentication indicator; and responsive to evaluating the authentication indicator, processing, by the server computer, the transaction using the cryptocurrency.

Another embodiment is related to a server computer comprising: a processor; and a computer-readable medium coupled to the processor, the computer-readable medium comprising code executable by the processor for implementing a method comprising: receiving a request from a user to obtain a resource in a transaction using a cryptocurrency; determining that the transaction is to be conducted using the cryptocurrency; initiating an authentication request message to an access control server via a directory server, wherein the access control server authenticates the user and generates an authentication indicator; receiving, from the access control server, an authentication response comprising the authentication indicator; evaluating the authentication indicator; and responsive to evaluating the authentication indicator, processing the transaction using the cryptocurrency.

Further details regarding embodiments of the disclosure can be found in the Detailed Description and the Figures.

DETAILED DESCRIPTION

Figure 1:
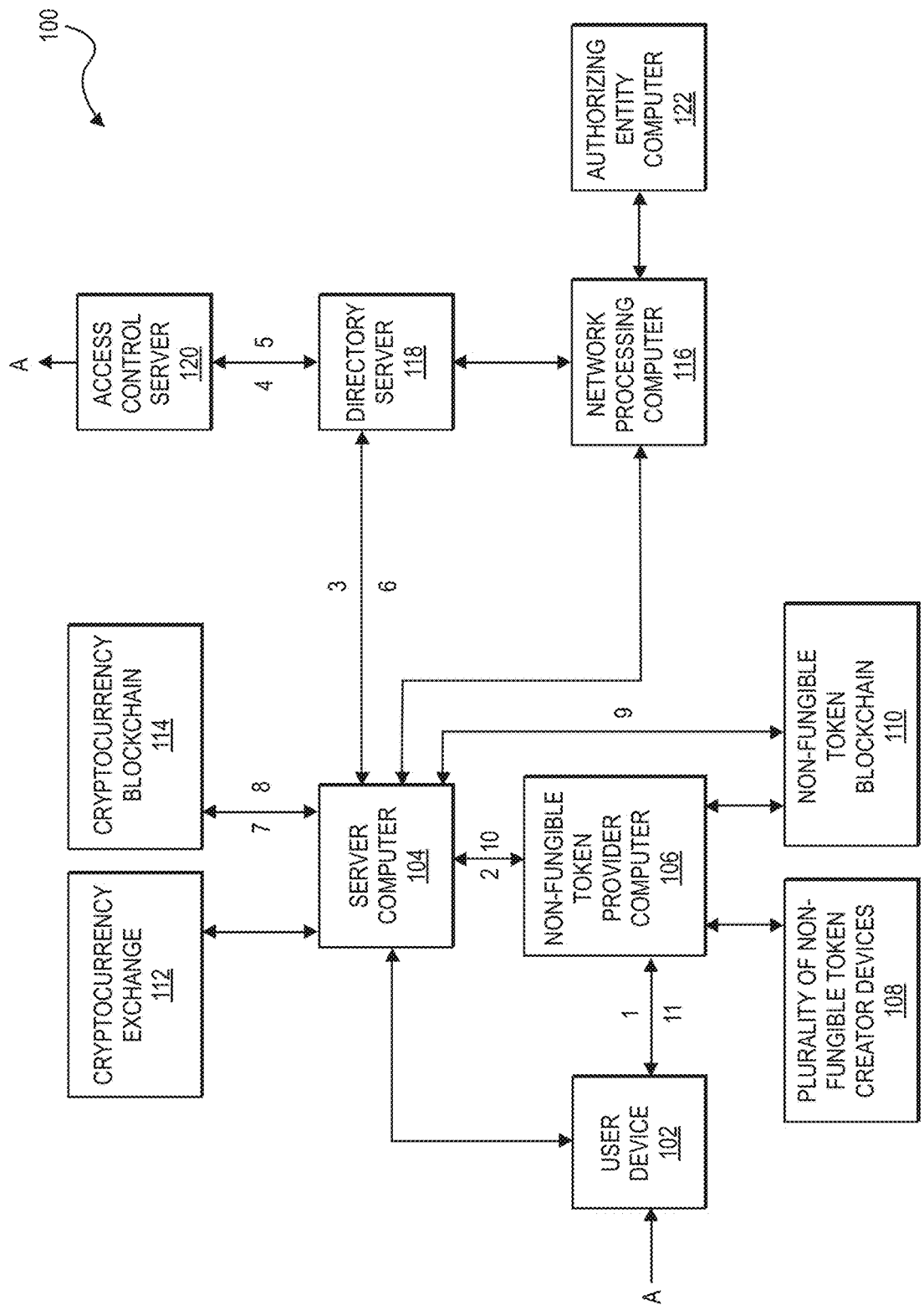
FIG. 1 shows a block diagram illustrating an authentication system according to embodiments.

Prior to discussing embodiments of the disclosure, some terms can be described in further detail.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "user" may include an individual. In some embodiments, a user may be associated with one or more personal accounts and/or mobile devices. The user may also be referred to as a cardholder, account holder, or consumer in some embodiments.

A "user identifier" can include any piece of data that can identify a user. A user identifier can comprise any suitable alphanumeric string of characters. In some embodiments, the user identifier may be derived from user identifying information. In some embodiments, a user identifier can include an account identifier associated with the user.

"Credentials" may comprise any evidence of authority, rights, or entitlement to privileges. For example, access credentials may comprise permissions to access certain tangible or intangible assets, such as a building or a file. Examples of credentials may include passwords, passcodes, or secret messages. In another example, payment credentials may include any suitable information associated with and/or identifying an account (e.g., a payment account and/or payment device associated with the account). Such information may be directly related to the account or may be derived from information related to the account. Examples of account information may include an "account identifier" such as a PAN (primary account number or "account number"), a token, a subtoken, a gift card number or code, a prepaid card number or code, a user name, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234". In some embodiments, credentials may be considered sensitive information.

A "non-fungible token" (NFT) can be a cryptographic asset, cryptographic token, or digital ledger object that is recorded on a blockchain. Non-fungible tokens are typically indivisible, and not mutually interchangeable. A given non-fungible token can have unique information, attributes, or characteristics, such as permanent, unalterable metadata that describes or defines its authenticity. Ownership of a non-fungible token is generally transferrable. In contrast, other "fungible" cryptocurrencies, such as Bitcoin, are identical to each other and can be traded or exchanged as identical units and are usually infinitely subdividable. Non-fungible token may function as unique certificates of authenticity, making them suitable for use to "tokenize" digital assets, such as copyrighted works. In some embodiments, a non-fungible token may be implemented according to a token standard. For example, a non-fungible token may be implemented according to the ERC-20 standard, the ERC-721 standard, the ERC-994 standard, the ERC-998 standard, the ERC-1155 standard, and/or any other token standard configured for the Ethereum blockchain network or any other blockchain network that includes a virtual machine for executing contract bytecode on its blockchain. Each token standard may have different requirements of features. A non-fungible token can have those features to be considered a non-fungible token that implements that standard and that can be used by smart contracts or applications that also are generated according to that token standard.

A "digital wallet" may contain electronic information for conducting transactions. A digital wallet may store user profile information, payment credentials, bank account information, cryptocurrency account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "digital wallet provider" may include an entity, such as an issuing bank, which issues a digital wallet to a user that enables the user to conduct financial transactions. A digital wallet provider may provide standalone user-facing software applications that store account numbers on behalf of a cardholder (or other user) to facilitate payments at more than one unrelated merchant, perform person-to-person payments, or load financial value into the digital wallet. A digital wallet provider may enable a user to access its account via a personal computer, mobile device, or access device. Additionally, a digital wallet provider may also provide one or more of the following functions: storing one or more payment cards, maintaining one or more cryptocurrency accounts, storing other information including billing address, shipping addresses, and transaction history, initiating a transaction by one or more methods, such as providing a username and password, NFC, or a physical token, and may facilitate pass-through or two-step transactions.

A "currency exchange" may be a computer, a group of computers, an entity, or a group of entities that facilitate exchanges between cryptocurrencies and/or fiat currencies at the request of parties. A currency exchange may manage any suitable number of accounts associated with registered parties.

A "cryptocurrency network" may include a one or more computers that participate in maintaining a cryptocurrency ledger. In some cryptocurrency networks, the distributed cryptocurrency ledger may comprise a blockchain.

A "blockchain" can be a distributed database that maintains a continuously growing list of records secured from tampering and revision. A blockchain can be a non-fungible token blockchain, a cryptocurrency blockchain, or a combination thereof. A blockchain may include a number of blocks of interaction records. Each block in the blockchain can contain also include a timestamp and a link to a previous block. Stated differently, interaction records in a blockchain may be stored as a series of "blocks," or permanent files that include a record of a number of interactions occurring over a given period of time. Blocks may be appended to a blockchain by an appropriate node after it completes the block and the block is validated. Each block can be associated with a block header. In embodiments of the invention, a blockchain may be distributed, and a copy of the blockchain may be maintained at each full node in a verification network. Any node within the verification network may subsequently use the blockchain to verify interactions. A blockchain can be stored, maintained, and updated in a distributed manner in a peer-to-peer network. For example, in a cryptocurrency application, such as Bitcoin or Ethereum, Ripple, Dash, Litecoin, Dogecoin, zCash, Tether, Bitcoin Cash, Cardano, Stellar, EOS, NEO, NEM, Bitshares, Decred, Augur, Komodo, PIVX, Waves, Steem, Monero, Golem, Stratis, Bytecoin, Ardor, or in digital currency exchanges, such as Coinbase, Kraken, CEX.IO, Shapeshift, Poloniex, Bitstamp, Coinmama, Bisq, LocalBitcoins, Gemini and others where the distributed ledger represents each transaction and where units of the cryptocurrency are transferred between entities.

A "blockchain network" can include a computer network that maintains a blockchain.

A "block header" can be a header including information regarding a block in a blockchain. A block header can be used to identify a particular block on a blockchain. A block header can comprise any suitable information, such as a previous hash, a Merkle root, a timestamp, and a nonce. In some embodiments, a block header can also include a difficulty value.

A "non-fungible token blockchain" can include a blockchain that stores non-fungible tokens. A non-fungible token blockchain can include non-fungible tokens and smart contracts. A non-fungible token blockchain can be utilized to transfer a non-fungible token from one public address to another public address.

A "cryptocurrency blockchain" can include a blockchain that stores cryptocurrency. A cryptocurrency blockchain can be utilized to transfer cryptocurrency from one public address to another public address.

A "cryptocurrency" can include a digital currency. A cryptocurrency can include a digital currency in which transactions are verified and records maintained by a decentralized system using cryptography. A cryptocurrency may not need to be maintained by a centralized authority.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment. An interaction can be a transfer of a resource from a first entity to a second entity.

A "resource" can include digital items and/or physical items. A resource can be an item that is obtainable. A resource can be owned by an entity. A resource can be a physical item such as goods, etc. A resource can be a digital item such as non-fungible tokens, etc.

An "access control server" may be a server computer that is programmed to authenticate a user. In some embodiments, an access control server can receive authentication request messages. An access control server may be programmed to transmit challenge request messages and receive challenge response messages from a user device (or application operating thereon) or a server computer. In some embodiments, the access control server may be further programmed to verify the enrollment of an account in a secure authentication program, perform an analysis to determine whether the interaction should be authenticated, and return an authentication response message to a resource provider computer (e.g., via a directory server computer).

A "network processing computer" may include a server computer used for interaction processing. In some embodiments, the network processing computer may be coupled to a database and may include any hardware, software, other logic, or combination of the preceding for servicing the requests from one or more client computers. The network processing computer may comprise one or more computational apparatuses and may use any of a variety of computing structures, arrangements, and compilations for servicing the requests from one or more client computers. In some embodiments, a network processing computer may include data processing subsystems, networks, and operations used to support and deliver authorization services, exception file services, and clearing and settlement services. An exemplary network processing computer may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The network processing computer may use any suitable wired or wireless network, including the Internet.

The network processing computer may process interaction-related messages (e.g., authorization request messages and authorization response messages) and determine the appropriate destination computer (e.g., an issuer computer) for the interaction-related messages. In some embodiments, the network processing computer may authorize interactions on behalf of an issuer. The network processing computer may also handle and/or facilitate the clearing and settlement of interactions.

A "challenge request message" may include a message sent as part of an authentication process for a user and/or user computing device. In some embodiments, the challenge request message may contain a request for the user to submit pre-established authentication data in order to authenticate an account or user device. The challenge request message may be generated and sent (e.g., by an access control server) prior to authenticating the account, user, and/or user device.

A "challenge response message" may include a message sent as part of an authentication process for a user and/or user device. In some embodiments, the challenge response message may be transmitted from a user device to an access control server or a directory server computer. The challenge response message may contain authentication data in order to authenticate an account or payment device.

"Authentication data" may include any data suitable for authenticating a user or mobile device. Authentication data may be initially obtained from a user or a device that is operated by the user. Examples of authentication data obtained from a user may include PINs (personal identification numbers), passwords, biometric data, etc. Examples of authentication data that may be obtained from a device may be include device serial numbers, hardware secure element identifiers, device fingerprints, phone numbers, IMEI numbers, etc.

An "authentication request message" may include a message sent as part of an authentication process. The authentication request message may request an authentication process be performed for a user, a user device, etc.

An "authentication response message" may include a message sent as part of an authentication process in response to an authentication request message. An authentication response message may include the results of an authentication process based on data received in the authentication request message.

An "authentication indicator" can include data indicating an authentication status. An authentication indicator can indicate whether or not a user and/or a user device is authentic.

An "authorization request message" may be an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a username, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

Embodiments provide for a trusted authentication system can authenticate a user and/or a user device during an interaction that uses a blockchain. Also, in some embodiments, the user can perform interactions using a cryptocurrency as a method of payment. However, if the user does not have enough cryptocurrency to complete the transaction, some embodiments provide for a method in which alterative funds can be obtained for the transaction from an alternative source during the transaction.

FIG. 1 shows a system 100 according to embodiments of the disclosure. The system 100 comprises a user device 102, a server computer 104, a non-fungible token provider computer 106, a plurality of non-fungible token creator devices 108, a non-fungible token blockchain 110, a cryptocurrency exchange 112, a cryptocurrency blockchain 114, a network processing computer 116, a directory server 118, an access control server 120, and an authorizing entity computer 122. The non-fungible token blockchain 110 may be maintained by a non-fungible token blockchain network. The cryptocurrency blockchain 114 can be maintained by a cryptocurrency blockchain 114.

The user device 102 can be in operative communication with the server computer 104, the non-fungible token provider computer 106, and in some embodiments, the access control server 120. The server computer 104 can be in operative communication with the user device 102, the non-fungible token provider computer 106, the non-fungible token blockchain network operating the non-fungible token blockchain 110, the cryptocurrency exchange 112, the cryptocurrency blockchain network maintaining the cryptocurrency blockchain 114, the network processing computer 116, and the directory server 118. The non-fungible token provider computer 106 can be in operative communication with the user device 102, the server computer 104, the plurality of non-fungible token creator devices 108, and the non-fungible blockchain network maintaining the non-fungible token blockchain 110. The plurality of non-fungible token creator devices 108 can be in operative communication with the non-fungible token provider computer 106, and in some embodiments, directly with the non-fungible token blockchain network maintaining the non-fungible token blockchain 110. The non-fungible token blockchain network maintaining the non-fungible token blockchain 110 can be in operative communication with the non-fungible token provider computer 106 and the server computer 104. The cryptocurrency exchange 112 can be in operative communication with the server computer 104. The cryptocurrency blockchain network maintaining the cryptocurrency blockchain 114 can be in operative communication with the server computer 104. The network processing computer 116 can be in operative communication with the server computer 104, the directory server 118, and the authorizing entity computer 122. The directory server 118 can be in operative communication with the server computer 104, the network processing computer 116, and the access control server 120. The access control server 120 can be in operative communication with the directory server 118 and, in some embodiments, the user device 102. The authorizing entity computer 122 can be in operative communication with the network processing computer 116.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between the devices included in the system 100 as illustrated in FIG. 1 can be transmitted using a secure communications protocol such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The user device 102 can include a device operated by a user. The user device 102 can be a smart phone, a laptop computer, a desktop computer, a smart watch, a tablet, etc. The user device 102 can be programmed to allow the user to create and/or manage a cryptocurrency account with a digital wallet application installed on the user device 102. For example, the user device 102 can contain an application programmed to maintain user public keys, user private keys, and cryptocurrencies and non-fungible tokens associated with the user public keys.

The server computer 104 can include a computer programmed to initiate authentication requests and authorization requests. In some embodiments, the server computer 104 can be a wallet server computer. In other embodiments, the server computer 104 can be a resource provider computer. For example, the server computer 104 illustrated in FIG. 1 can be a wallet server computer, whereas the server computer 104 illustrated in FIG. 2 can be a resource provider computer.

Details regarding the server computer 104 and the user device 102 can be found in FIG. 3 and FIG. 4, respectively, and will be discussed herein before returning to the descriptions of other devices illustrated in FIG. 1.

Figure 3:
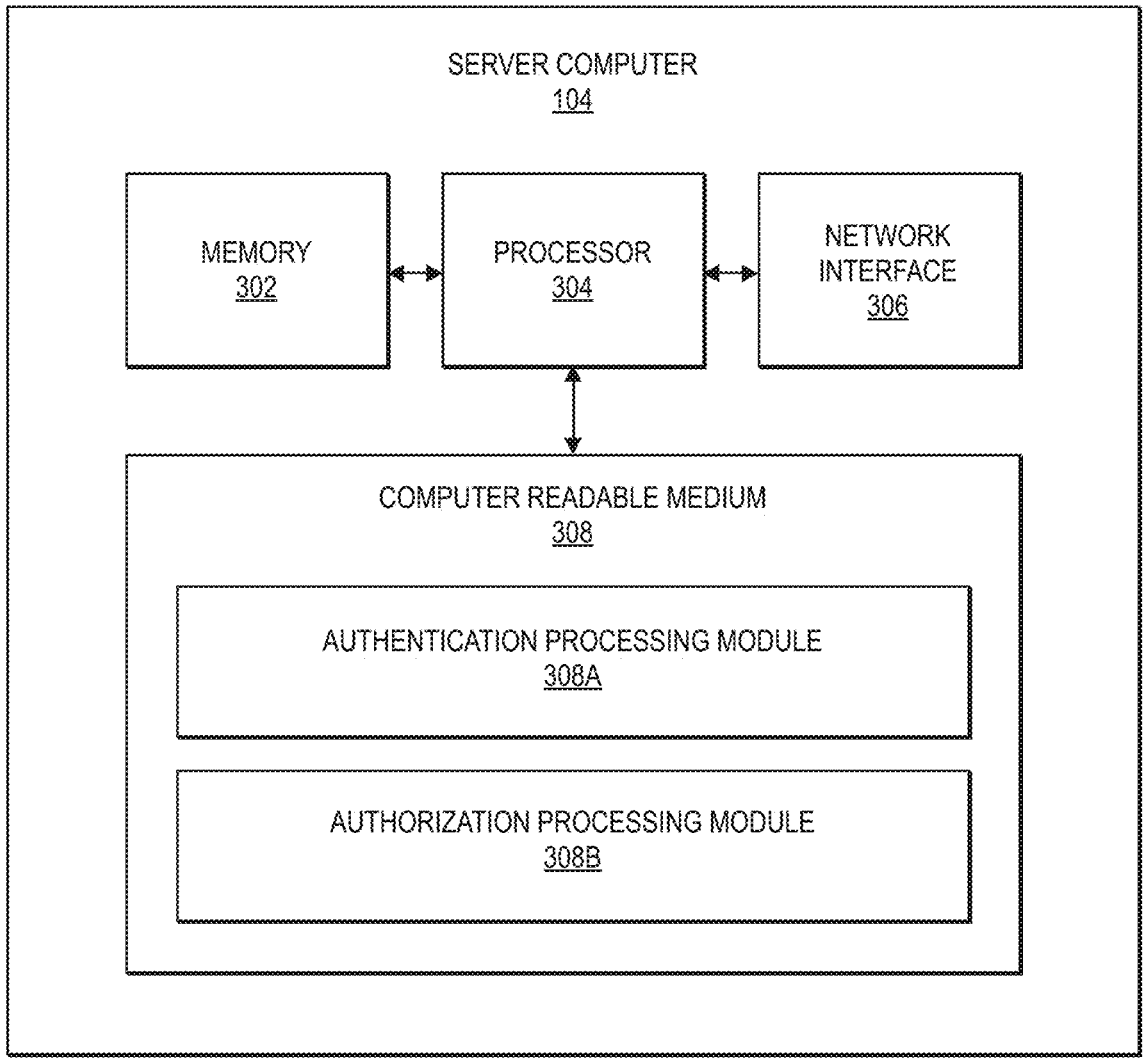
FIG. 3 shows a block diagram illustrating components of a server computer according to embodiments.

FIG. 3 shows a block diagram of a server computer according to embodiments. The exemplary server computer 104 may comprise a processor 304. The processor 304 may be coupled to a memory 302, a network interface 306, and a computer readable medium 308. The computer readable medium 308 can comprise an authentication processing module 308A and an authorization processing module 308B.

The memory 302 can be used to store data and code. For example, the memory 302 can store credentials, a user profile for the user that contains user data and data regarding cryptocurrencies and alternative currencies (e.g., fiat currencies), and rules relating to the use of the cryptocurrencies and the alternative currencies, a profile of the user that contains a mapping between a cryptocurrency user identifier for a cryptocurrency and a credential associated with an account such as a fiat currency account, etc. The memory 302 may be coupled to the processor 304 internally or externally (e.g., cloud based data storage), and may comprise any combination of volatile and/or non-volatile memory, such as RAM, DRAM, ROM, flash, or any other suitable memory device.

In some embodiments, the server computer 104 can generate, obtain, store, and/or maintain a user's cryptographic public key and cryptographic private key. The user's public key and private key can be utilized to perform cryptocurrency transactions and/or otherwise interact with a blockchain network. The server computer 104 can store the user's public key and private key on behalf of the user, thus increasing security in the event when the user loses their user device. The sever computer 104 can receive the user's public key and private key from the user device 102 or can generate the user's public key and private key. The user's public key, as an example, can be utilized to verify that a digital asset, such as an NFT, is owned by the user. The user's private key, as an example, can be utilized to sign data during a transaction.

The computer readable medium 308 may comprise code, executable by the processor 304, for performing a method comprising: receiving, by a server computer, a request from a user to obtain a resource in a transaction using a cryptocurrency; determining, by the server computer, that the transaction is to be conducted using the cryptocurrency; initiating, by the server computer, an authentication request message to an access control server via a directory server, wherein the access control server authenticates the user and generates an authentication indicator; receiving, by the server computer from the access control server, an authentication response comprising the authentication indicator; evaluating, by the server computer, the authentication indicator; and responsive to evaluating the authentication indicator, processing, by the server computer, the transaction using the cryptocurrency.

The authentication processing module 308A can include code or software, executable by the processor 304, for initiating authentication. For example, after receiving an interaction request message from the user device 102 or the non-fungible token provider computer 106 for an interaction intending to utilize a cryptocurrency, the authentication processing module 308A, in conjunction with the processor 304, can identify whether or not the server computer 104 stores a profile of the user (e.g., a first profile) that contains a mapping between a cryptocurrency user identifier (e.g., a public key) and a credential associated with an account. If the authentication processing module 308A, in conjunction with the processor 304, identifies a first profile, then the authentication processing module 308A, in conjunction with the processor 304, can generate an authentication request message comprising the credential. The authentication processing module 308A, in conjunction with the processor 304, can provide the authentication request message to an access control server via a directory server for authentication.

The authentication processing module 308A, in conjunction with the processor 304, can receive an authentication response message comprising an authentication indicator and, in some embodiments, the credential from the access control server via the directory server. The authentication processing module 308A, in conjunction with the processor 304, can evaluate the authentication indicator. For example, the authentication processing module 308A, in conjunction with the processor 304, can determine whether or not the authentication indictor indicates that the user and/or the user device is authentic. If the authentication indicator indicates that the user and/or the user device is not authentic, then the authentication processing module 308A, in conjunction with the processor 304, can terminate the interaction. If the authentication indicator indicates that the user and/or the user device is authentic, then the authentication processing module 308A, in conjunction with the processor 304, can proceed with the interaction and can activate the authorization processing module 308B.

The authorization processing module 308B can include code or software, executable by the processor 304, for initiating authorization. The authorization processing module 308B, in conjunction with the processor 304, can initiate authorization for an interaction. The authorization processing module 308B, in conjunction with the processor 304, can determine one or more methods for authorizing the interaction. The authorization processing module 308B, in conjunction with the processor 304, can access a user profile for the user, stored in the server computer 104, that contains user data (e.g., a universal identifier, a unique user name, or other data that uniquely identifies the user) and data regarding one or more cryptocurrencies and one or more alternative currencies (e.g., a public key, an account number, etc.), and rules relating to the use of the one or more cryptocurrencies and the one or more alternative currencies. The authorization processing module 308B, in conjunction with the processor 304, can initiate authorization for the interaction based on user preferences including any authorization methods selected by the user and/or rules relating to the use of any currencies held by the user.

For example, the authorization processing module 308B, in conjunction with the processor 304, can determine that a transaction to obtain an item in an interaction is associated with an amount. The authorization processing module 308B, in conjunction with the processor 304, can then determine that the amount of cryptocurrency owned by the user is less than the amount of the item. The authorization processing module 308B, in conjunction with the processor 304, can further determine an amount of alternative currency (e.g., alternative cryptocurrency, fiat currency, etc.) needed to complete the transaction for the item. The authorization processing module 308B, in conjunction with the processor 304, can then proceed to request authorization from the one or more entities that provide authorization for each of the one or more different authorization methods. For example, the authorization processing module 308B, in conjunction with the processor 304, can communicate with a cryptocurrency blockchain network maintaining a cryptocurrency blockchain to obtain authorization for use of a cryptocurrency in the transaction, and/or can communicate with an authorizing entity computer to obtain authorization to use alternative currency funds (e.g., fiat currency funds) maintained by the authorizing entity computer.

The authorization processing module 308B, in conjunction with the processor 304, can generate an authorization request message comprising data related to authorization of the interaction (e.g., interaction data, public keys, credentials, etc.). The authorization processing module 308B, in conjunction with the processor 304, can provide the authorization request message to an entity that can provide authorization for the chosen authentication method.

The network interface 306 may include an interface that can allow the server computer 104 to communicate with external computers. The network interface 306 may enable the server computer 104 to communicate data to and from another device (e.g., a user device, a non-fungible token provider computer, a non-fungible token blockchain, a cryptocurrency exchange, a cryptocurrency blockchain, a directory server, a network processing computer, etc.). Some examples of the network interface 306 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 306 may include Wi-Fi™. Data transferred via the network interface 306 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 306 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 4:
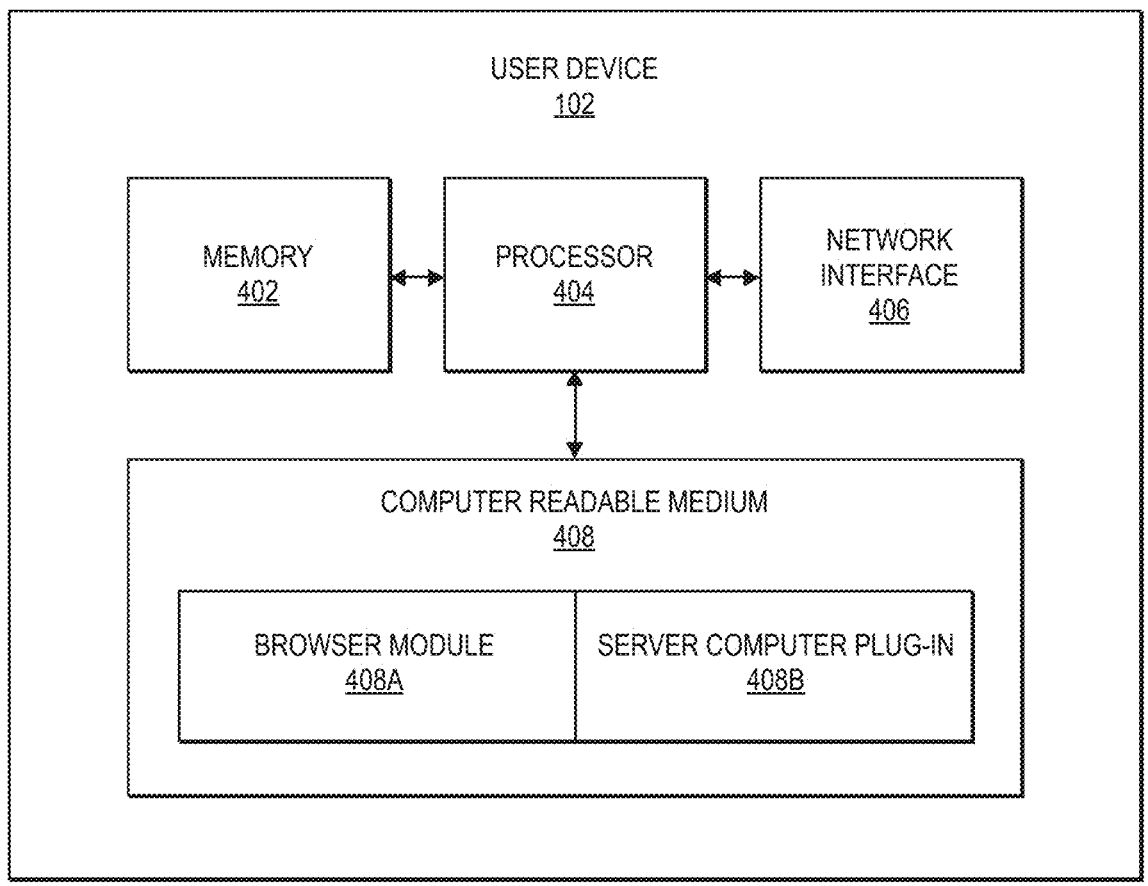
FIG. 4 shows a block diagram illustrating components of a user device according to embodiments.

FIG. 4 shows a block diagram of a user device according to embodiments. The exemplary user device 102 may comprise a processor 404. The processor 404 may be coupled to a memory 402, a network interface 406, and a computer readable medium 408. The computer readable medium 408 can comprise a browser module 408A and a server computer plug-in 408B.

The memory 402 can be used to store data and code. The memory 402 may be coupled to the processor 404 internally or externally (e.g., cloud based data storage), and may comprise any combination of volatile and/or non-volatile memory, such as RAM, DRAM, ROM, flash, or any other suitable memory device.

The computer readable medium 408 may comprise code, executable by the processor 404, for performing methods and processes described herein.

The browser module 408A can include code or software, executable by the processor 404, for accessing webpages on the Internet. The browser module 408A, in conjunction with the processor 404, can receive data from and send data to computers that host webpages. The browser module 408A, in conjunction with the processor 404, can provide messages (e.g., an interaction request message, etc.) to server computers, non-fungible token provider computers, etc. When the user of the user device 102 selects a webpage to access, the browser module 408A, in conjunction with the processor 404, retrieves files from a web server (e.g., the non-fungible token provider computer, etc.) and then graphically renders the page on a screen of the user device 102.

The browser module 408A, in conjunction with the processor 404, can communicate with one or more browser extensions and/or browser plug-ins, herein collectively referred to as plug-ins. The browser module 408A, in conjunction with the processor 404, can communicate with the server computer plug-in 408B.

The server computer plug-in 408B can be a software module for customizing the web browser of the browser module 408A. The server computer plug-in 408B can be a digital wallet browser plug-in. The server computer plug-in 408B, in conjunction with the processor 404, can communicate with the server computer 104 and/or a website hosted by the server computer 104.

The server computer plug-in 408B can be activated on particular webpages during particular events. For example, when the browser module 408A, in conjunction with the processor 404, accesses a webpage hosted by the non-fungible token provider computer 106, the user of the user device 102 can make a selection to initiate an interaction. The browser module 408A, in conjunction with the processor 404, can trigger one or more events when interactions are initiated. The server computer plug-in 408B, in conjunction with the processor 404, can also initialize communication with the server computer to process the interaction with the server computer. For example, the server computer plug-in 408B, in conjunction with the processor 404 and the browser module 408A, can present a checkout screen or frame to the user of the user device 102. The user can use the frame to confirm various interaction details and continue with authentication and/or authorization for the interaction. The server computer plug-in 408B, in conjunction with the processor 404 and the browser module 408A, can provide the interaction request message comprising at least the interaction data to the server computer.

Even though the server computer plug-in 408B is referred to as a plug-in, it is understood that the server computer plug-in 408B can be a server computer browser extension.

The network interface 406 can be similar to the network interface 306 and description thereof will not be repeated here.

Referring back to FIG. 1, the non-fungible token provider computer 106 can include a computer that facilitates obtaining, transferring, and maintaining non-fungible tokens. The non-fungible token provider computer 106 can be a non-fungible token marketplace computer. The non-fungible token provider computer 106 can allow users to obtain (e.g., purchase) non-fungible tokens through a Web interface provided by a website maintained by the non-fungible token provider computer 106. The non-fungible token provider computer 106 can allow the plurality of non-fungible token creator devices 108 to create (e.g., mint) new non-fungible token provider computer 106 and make the newly created non-fungible tokens available for purchase by users. The non-fungible token provider computer 106 can interact with the non-fungible token blockchain 110 to update ownership and other data related to the non-fungible tokens included in the non-fungible token blockchain 110.

The plurality of non-fungible token creator devices 108 can be user devices operated by non-fungible token creators. A non-fungible token creator device can communicate with the non-fungible token provider computer 106 to create new non-fungible tokens.

The non-fungible token blockchain 110 can be maintained by a non-fungible token blockchain computer network. The non-fungible token blockchain 110 can be a decentralized and distributed digital record. The non-fungible token blockchain 110 can include a plurality of blocks with block headers. The blocks on the non-fungible token blockchain 110 can include smart contracts and/or non-fungible tokens. New blocks including new non-fungible tokens can be added to the non-fungible token blockchain 110.

The cryptocurrency exchange 112 can include a computer or a network of computers that allow entities to exchange cryptocurrencies. Users that attempt to sell cryptocurrency may conduct a cryptocurrency transaction to transfer their cryptocurrency to the cryptocurrency exchange 112 and the cryptocurrency exchange 112 may manage the cryptocurrency on behalf of the user. Users may additionally, or alternatively, transfer fiat currency to the cryptocurrency exchange 112 and the cryptocurrency exchange 112 may manage the users' fiat currency within the cryptocurrency exchange 112.

In some embodiments, a user may provide the cryptocurrency exchange 112 with a "buy request" indicating that the user is attempting to purchase a particular amount of cryptocurrency for a particular amount (or within a range of the particular amount) of fiat currency. Users may also provide the cryptocurrency exchange 112 with a "sell request" indicating that the user is attempting to sell cryptocurrency for a particular amount (or within a range of the particular amount) of fiat currency. The cryptocurrency exchange 112 may be configured to match a buy request to a sell request in order to identify a buyer that is willing to purchase cryptocurrency at the fiat currency amount (or within the range) at which the seller is interested in selling. If a match is found, the cryptocurrency exchange 112 can facilitate a transfer of the fiat currency from the buyer's account within the cryptocurrency exchange 112 to the seller's account within the cryptocurrency exchange 112. The cryptocurrency exchange 112 can also facilitate the transfer of the cryptocurrency from the seller's account within the cryptocurrency exchange 112 to the buyer's account within the cryptocurrency exchange 112. The cryptocurrency exchange 112 can also interact with the server computer 104 to exchange cryptocurrencies for a transaction initiated by the user device 102.

The cryptocurrency blockchain 114 can be maintained by a blockchain network that has a plurality of nodes. The cryptocurrency blockchain 114 can be a decentralized and distributed digital record. The cryptocurrency blockchain 114 can include a plurality of blocks with block headers. The blocks of the cryptocurrency blockchain 114 can include transactions that indicate a sender address and a receiver address, where an address can be a public key. A device can communicate with the cryptocurrency blockchain network maintaining the cryptocurrency blockchain 114 to verify that an entity associated with a public key has a particular amount of cryptocurrency.

The directory server 118 can include a server computer programmed to route messages between two computers. For example, the directory server 118 may route messages between the server computer 104 and the access control server 120. In some embodiments, the directory server 118 may route authentication request messages and/or authentication response messages between the server computer 104 and the access control server 120 as part of an interaction involving the user device 102. In some embodiments, the directory server 118 may be operated by the network processing computer 116.

In some embodiments, the directory server 118 may be programmed to perform an enrollment verification process on behalf of the access control server 120. In such embodiments, the directory server 118 may store data regarding accounts or account identifiers that are enrolled in the secure authentication program.

The access control server 120 can include a server computer that may be configured to conduct authentication processes. The access control server 120 may be associated with an issuer, which can be an authorization entity that issues and maintains accounts for a user. The access control server 120 may use user-specific data, user computing device data, transaction data, PAN, payment device data, geolocation data, account data, or other comparable data, in order to perform an authentication for the transaction. In some embodiments, at the time of a transaction, the access control server 120 may perform the authentication, and may provide an authentication response message to the server computer 104 via the directory server 118. The authentication response message may provide an indication to the server computer 104 that the account, user, and or user device 102 has been authenticated or not authenticated.

The access control server 120 can store a second profile of the user of the user device. The second profile can contain a mapping between the credential and authentication information of the user or the user's user device.

The authorizing entity computer 122 can include a computer that issues and maintains user accounts for users. The authorizing entity computer 122 may issue credentials for user accounts. The authorizing entity computer 122 may also be programmed to conduct authorization processes. The authorizing entity computer 122 can receive authorization request messages for interactions and can determine whether or not to authorize the interaction. In some embodiments, the authorizing entity computer 122 may include the access control server 120. In other embodiments, the access control server 120 may be separate and distinct from the authorizing entity computer 122.

FIG. 1 further illustrates an authentication method according to embodiments. The method illustrated in FIG. 1 will be described in the context of the user device 102 and/or a user of the user device 102 being authenticated during an interaction to obtain a non-fungible token from the non-fungible token provider computer 106. It is understood, however, that embodiments of the invention can be applied to other circumstances.

At step 1, the user device 102 can receive a selection to obtain a resource (e.g., a non-fungible token) from the non-fungible token provider computer 106. For example, the user device 102 can access a webpage hosted by the non-fungible token provider computer 106 and select a non-fungible token to purchase. In some embodiments, the user device 102 can select a currency that the user will attempt to utilize to obtain the non-fungible token. For example, the user device 102 can receive a selection to utilize a particular cryptocurrency (e.g., Ethereum, SOL, etc.) to use to purchase the non-fungible token. In other embodiments, the user device 102 may not select a currency for the current interaction, but may have previously provided rules relating to the use of primary funding sources (e.g., a cryptocurrency) and alternative funding sources (e.g., a fiat currency) to purchase non-fungible tokens.

The browser on the user device 102 can have a server computer plug-in, which allows the server computer 104 to communicate with the user device 102 through the webpage hosted by the non-fungible token provider computer 106. In such an example, the server computer 104 can be a digital wallet provider computer that can maintain or manage cryptocurrencies and/or credentials (e.g., a PAN or token) for the user.

The user device 102 can generate a request to obtain the resource. The request to obtain the resource can be a request to obtain a non-fungible token from the non-fungible token provider computer 106. The request to obtain the resource can include an amount (e.g., a requested cost of the non-fungible token) and an indication of the non-fungible token (e.g., a token identifier and a contract address). The request to obtain the resource can also include a receiver address for the interaction. The receiver address can be a public address of the provider of the non-fungible token. In some embodiments, the request to obtain the resource can also include data that identifies the cryptocurrency that the user has selected to use for the interaction. In some embodiments, the address can correspond to a public key.

At step 2, the server computer 104 can receive a request to obtain the resource from the user device 102 via the non-fungible token provider computer 106. The server computer 104 can determine that the purchase is to be made using the cryptocurrency as requested by the user or as indicated by rules.

The server computer 104, can then initiate an authentication request message to authenticate the user and/or the user device 102. This is beneficial since the credibility and/or authenticity of the user device 102 may not be known to the server computer 104. Furthermore, the user device 102 may have been stolen by an unauthorized user, and the unauthorized user may be attempting to perform an interaction with the user device 102. Since the server computer 104 can verify whether or not the user is authentic in embodiments of the invention, the server computer 104 can prevent any transactions conducted by unauthorized persons.

In some embodiments, the server computer 104 can store a first profile of the user of the user device 102. The first profile can contain a mapping between a cryptocurrency user identifier for the cryptocurrency and a credential associated with an account. The cryptocurrency user identifier for the cryptocurrency can be a user public key that is the public address on the relevant blockchain for the cryptocurrency and is owned by the user of the user device. The credential associated with an account can be a token (e.g., a payment token, a primary account number, etc.) that is associated with the account. The account can be maintained by the authorizing entity computer 122. The account be, for example, the user's credit, debit, or prepaid card account.

In some embodiments, the server computer 104 can determine the credential associated with the user involved in the interaction. For example, the request to obtain the resource, received from the user device 102, can include a public key selected by the user. The selected public key can be a public key associated with a cryptocurrency. The server computer 104 can obtain the credential from the first profile based on the selected public key as the cryptocurrency user identifier for the cryptocurrency. The server computer 104 can determine the cryptocurrency user identifier for the cryptocurrency based on the rules, and then determine the credential associated with the account based on the cryptocurrency user identifier. After determining the credential, the server computer 104 can generate an authentication request message comprising the credential.

At step 3, the server computer 104 can transmit the authentication request message to the directory server 118. The directory server 118 can determine to which of a plurality of access control servers 120 to provide the authentication request message. In some embodiments, the directory server 118 can include a routing table that contains mappings between credential identifiers or portions thereof, and access control server addresses. The credential identifier portions can be obtained or derived from the credential and can be utilized to identify the access control server address of the destination access control server. For example, a credential can be a sixteen digit number such as 4128 8283 2882 8831, and the first six digits may identify a particular authorizing entity computer and access control server. The access control server address can be an IP address of the access control server, and this can be mapped to the credential portion. In some embodiments, the directory server 118 can determine the credential identifier portion, and can look up an access control server address using the credential identifier portion.

At step 4, the directory server 118 can provide (e.g., transmit) the authentication request message to the access control server 120.

Upon receiving the authentication request, the access control server 120 can attempt to authenticate the user and/or the user device 102. For example, access control server 120 can determine if the user and/or the user device 102 needs to be authenticated. In some embodiments, the access control server 120 can include profiles (e.g., second profiles) for a plurality of users. Each profile can contain a mapping between the credential (e.g., a PAN or primary account number), authentication information (e.g., a PIN or a biometric) of the user and/or a user device of the user, and an address of the user device (e.g., a phone number, IP address, e-mail address, etc.). The access control server 120 can then utilize the authentication information to authenticate the user device 102 and/or the user of the user device 102. For example, the access control server 120 can send a request for the authentication information to the user device, and can receive the authentication information from the user device (e.g., via the path marked by the letter "A"). The access control server 120 can then identify the authentication information included in the profile that is associated with the received credential, and compare it to the authentication information that it received from the user device 102.

After the access control server 120 confirms that the authentication information provided by the user of the user 102 matches or does not match the authentication information stored by the access control server 120, the access control server 120 can generate an authentication indicator that indicates whether or not the user and/or the user device 102 is authentic. The access control server 120 can then generate an authentication response message comprising the authentication indicator.

Further details of processing performed by the access control server 120 and the directory server 118 will be described in reference to FIG. 5, below.

At step 5, the access control server 120 can provide the authentication response message to the directory server 118.

At step 6, after obtaining the authentication response message, the directory server 118 can provide the authentication response message to the server computer 104.

After receiving the authentication response message, the server computer 104 can evaluate the authentication indicator. For example, the server computer 104 can determine whether or not the authentication indicator indicates that the user and/or the user device 102 is authentic.

Responsive to evaluating the authentication indicator, if the authentication indicator indicates that the user and/or the user device 102 is authentic, the server computer 104 can process the interaction using the cryptocurrency. For example, the authentication indicator can generate a cryptocurrency transaction for the cryptocurrency blockchain 114. The cryptocurrency transaction can include the amount of the selected non-fungible token, the sender address (e.g., a public key of the user device 102), and the receiver address (e.g., the public key of the current owner of the non-fungible token).

At step 7, after generating the cryptocurrency transaction, the server computer 104 can submit the cryptocurrency transaction to the cryptocurrency blockchain 114. For example, the server computer 104 can submit the cryptocurrency transaction to a node that maintains the cryptocurrency blockchain 114.

Upon receiving the cryptocurrency transaction, the cryptocurrency blockchain 114 can process the cryptocurrency transaction and can include the cryptocurrency transaction in a block on the cryptocurrency blockchain 114 if the sender has an amount of cryptocurrency greater than or equal to the amount.

In some embodiments, at step 8, the server computer 104 can receive a notification from the cryptocurrency blockchain 114 that indicates whether or not the cryptocurrency transaction was successful. In other embodiments, at step 8, the server computer 104 can evaluate the cryptocurrency blockchain 114 to determine whether or not the cryptocurrency transaction was successful. The server computer 104 can obtain a proof that the cryptocurrency transaction was successful (e.g., included in the cryptocurrency blockchain 114).

At step 9, the server computer 104 can provide the proof that the cryptocurrency transaction was successful, or in some embodiments, an indication that the cryptocurrency transaction was submitted to the cryptocurrency blockchain 114, to the non-fungible token blockchain 110. For example, the server computer 104 can generate and provide a non-fungible token transfer request message (e.g., a transfer message) that requests that the non-fungible token be transferred from the current owner of the non-fungible token to the user of the user device. In particular, the server computer 104 can generate the non-fungible token transfer request message comprising the indication that the cryptocurrency transaction was successful or that the cryptocurrency transaction was submitted to the cryptocurrency blockchain 114 as well as the user public key and non-fungible token identifying data including a token identifier and a contract address.

The transfer message can also include a reference to at least one function in a smart contract referenced by the non-fungible token. The smart contract can be referenced by a contract identifier included in the non-fungible token. The smart contract can be stored on the non-fungible token blockchain 110.

The server computer 104 can provide the non-fungible token transfer request message to the non-fungible token blockchain 110 to transfer the ownership of the non-fungible token to the user public key.

Upon receiving the non-fungible token transfer request message, the non-fungible token blockchain 110 can process the non-fungible token transfer using the smart contract associated with, and indicated by, the contract address of the non-fungible token. The non-fungible token blockchain 110 can include the transfer into a block of the non-fungible token blockchain 110 and executes the at least one function in the smart contract. The execution of the at least one function in the smart contract transfers ownership of the non-fungible token to the user public key. The smart contract can include code that can process the transfer the owner of the non-fungible token from a current owner public key to the user public key. For example, such processing can be processed by a "transferFrom" function as indicated by the non-fungible token standard EIP-721.

At step 10, after submitting the transfer message to the non-fungible token blockchain 110, the server computer 104 can provide a message to the non-fungible token provider computer 106 that indicates that the transfer message was sent to and/or accepted by the non-fungible token blockchain 110.

At step 11, the non-fungible token provider computer 106 can notify the user device 102 of whether or not the transfer of the non-fungible token was successful. In some embodiments, the non-fungible token provider computer 106 can first verify that the transfer of the non-fungible token in the non-fungible token blockchain 110 using the token identifier and the contract identifier in the non-fungible token.

In some embodiments, during the interaction, the server computer 104 can determine that the purchase of the resource is associated with an amount. The server computer 104 can compare the amount to an amount of cryptocurrency owned by the user. The amount of cryptocurrency can be associated with a user public key for the cryptocurrency. The server computer 104 can then determine that the amount of cryptocurrency owned by the user is less than the amount of the resource resulting in a difference amount. The difference amount may be funded by additional cryptocurrency, a different cryptocurrency, and/or fiat currency. In some embodiments, the server computer 104 can initiate a second interaction to obtain additional cryptocurrency for the difference amount with the cryptocurrency exchange 112. For the second interaction, the server computer 104 can generate an authorization request message for the second interaction including the difference amount and the credential associated with the user device 102 of the user. The server computer 104 can provide the authorization request message to the authorizing entity computer 122 via the network processing computer 116 for authorization. The authorizing entity computer 122 can determine whether or not to authorize the interaction and generate an authorization response message comprising an indication of whether or not the second interaction is authorized. The server computer 104 can receive the authorization response message from the authorizing entity computer 122 via the network processing computer 116. The server computer 104 can then provide the authorization response message to the cryptocurrency exchange 112 to obtain an amount of additional cryptocurrency sufficient to purchase the resource. The server computer can then proceed with processing the transaction using the cryptocurrency and the additional cryptocurrency. At a later time, actual funds in fiat currency can be transferred from the authorizing entity computer 122 to an account held by the server computer 104 (e.g., at an acquirer). Actual funds may then be provided to the cryptocurrency exchange 112 to pay for the additional cryptocurrency.

Figure 2:
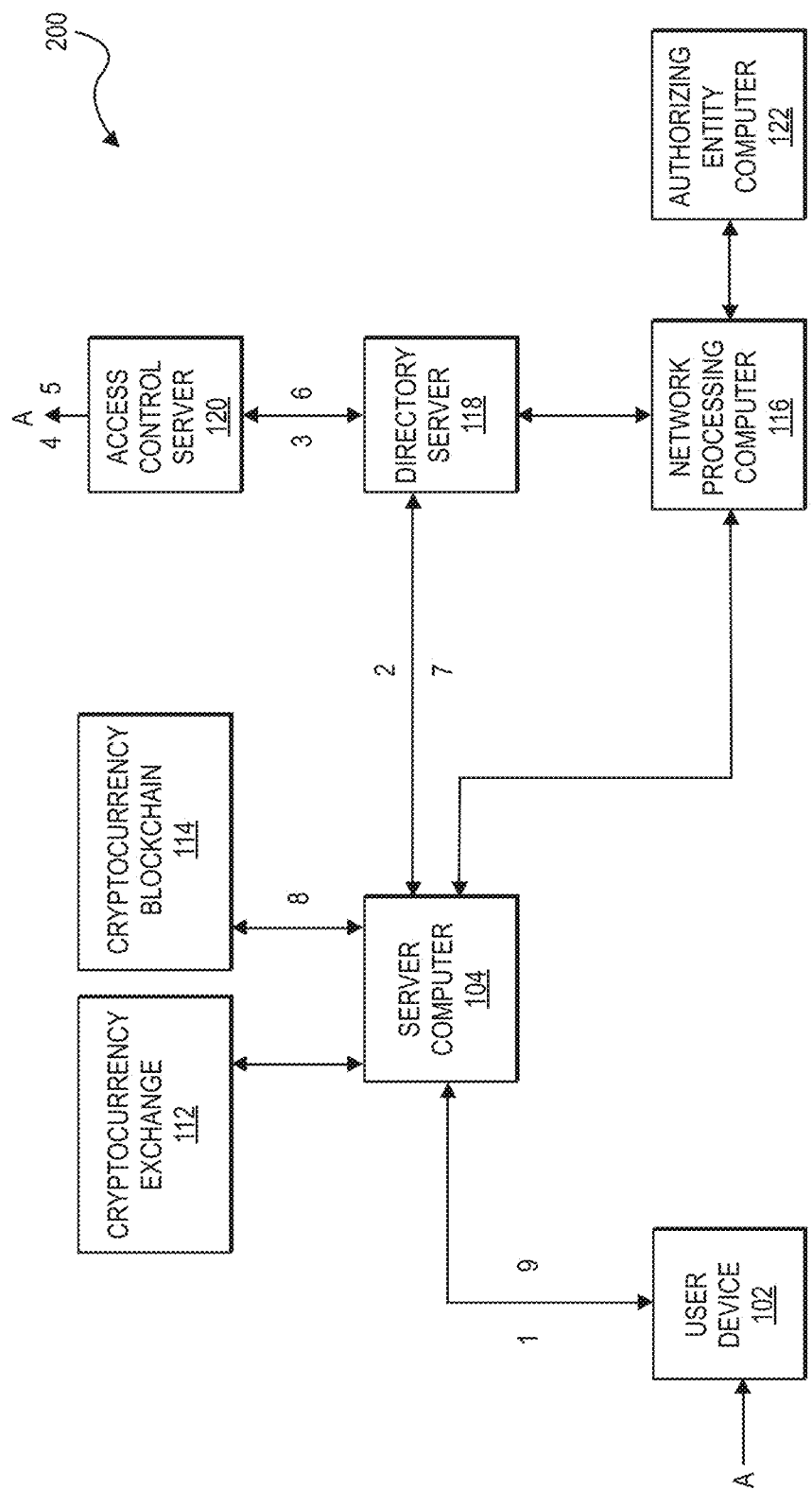
FIG. 2 shows a block diagram illustrating an alternative authentication system according to embodiments.

FIG. 2 shows a system 200 according to embodiments of the disclosure. The system 200 comprises the user device 102, the server computer 104, the cryptocurrency exchange 112, the cryptocurrency blockchain 114, the network processing computer 116, the directory server 118, the access control server 120, and the authorizing entity computer 122.

The server computer 104 illustrated in the system 200 can be a resource provider computer. The server computer 104 may include any suitable computational apparatus operated by a resource provider. Examples of resource provider computers may include an access device, a point of sale device, a web server computer that may host one or more websites associated with the resource provider, etc. The resource provider computer may perform some or all of the functions described above in connection with the server computer 104.

In some embodiments, the resource provider computer may be programmed to send data to the access control server 120 via the directory server 118 as part of an authentication process for a transaction between the user of the user device 102 and the resource provider of the resource provider computer. The resource provider computer may also be programmed to generate authorization request messages for interactions, and route the authorization request messages to an authorizing entity computer 122 for authorization. In some embodiments, the messages sent by the resource provider computer may be sent by a resource provider plug-in module, which may function as a proxy between the resource provider computer and the access control server 120 or other components within the system.

In some embodiments, the resource provider computer may transmit data through a communications medium to a transport computer (not shown) as part of an authorization process for an interaction. In some embodiments, the resource provider computer may receive interaction data from the user device 102 and transmit the interaction data to the transport computer for interaction-related processes (e.g., authorization) in an authorization request message.

FIG. 2 further illustrates an authentication method according to embodiments. The method illustrated in FIG. 2 will be described in the context of the user device 102 and/or a user of the user device 102 being authenticated during an interaction to obtain a resource from a resource provider. It is understood, however, that the invention can be applied to other circumstances.

At step 1, the user device 102 can initiate an interaction with the server computer 104. For example, the user device 102 can select one or more resources provided by the resource provider of the server computer 104 as presented on a webpage hosted by the server computer 104. The user device 102 can provide an interaction request message comprising interaction data to the server computer 104.

The interaction data can include an amount and an interaction method. The interaction method can indicate how the user of the user device 102 is attempting to pay for the interaction. For example, interaction data can include a primary account number (PAN) that can indicate to the server computer 104 to process the interaction using the PAN. Even though the example of a PAN is used, it is understood that any credential can be utilized. In some embodiments, the interaction data can include a user public key that is a public cryptocurrency address that references funds from which the user device 102 is attempting to pay. The interaction data can also indicate a particular blockchain, such as the cryptocurrency blockchain 114.

After receiving the interaction request message, the server computer 104 can generate an authentication request message to authenticate the user and/or the user device 102.

At step 2, the server computer 104 can provide the authentication request message to the directory server 118. The authentication request message may be sent over a secure connection by the server computer 104 to the directory server 118. In some embodiments, the authentication request message may be sent by a resource provider plug-in module of the server computer 104 that is configured to communicate with the directory server 118 directly.

The authentication request message can include user device data (e.g., operating system data, browser data, mobile application data, geo-location data), user-specific data (e.g., user name, user address data, user email address, user phone number), and/or other interaction data (e.g., shopping cart data, payment device data, payment account number), and/or other comparable data obtained from the user device 102 or determined by the server computer 104.

At step 3, after receiving the authentication request message, the directory server 118 can identify and route the authentication request message to an appropriate access control server 120 associated with the received interaction data (e.g., payment device data, payment account number, etc.). In some embodiments, the directory server 118 may evaluate the data received in the authentication request message to identify a particular access control server of a plurality of access control servers, as illustrated in FIG. 5, to which the authentication request message will be routed.

The access control server 120 can receive the authentication request message from the directory server 118. The access control server 120 can then perform an authentication process. The access control server 120 can determine whether or not the user and/or the user device 102 is authentic (e.g., as described above with respect to FIG. 1). In some embodiments, the access control server 120 can authenticate the user device 102 without communicating with the user device 102. In other embodiments, the access control server 120 can authenticate the user device 102 with communicating with the user device 102.

For example, the access control server 120 may perform an analysis using the user-specific data, user computing device data, and/or interaction data received in the authentication request message. In some embodiments, the analysis may include analyzing previous interactions associated with the user device 102, an account identifier, and/or the user device data. In some embodiments, the analysis may return a score associated with the interaction. The access control server 120 may evaluate the score against a pre-established threshold.

When the score is on a first side of the threshold (e.g., below the threshold), the interaction may be deemed to be low risk. In such situations, the access control server 120 may not require any direct communication with the user and/or the user device 102 for additional authentication data. For example, where the risk score indicates that the interaction is low risk, steps 5 and 6 may not be required.

However, when the score is on a second side of the threshold (e.g., above the threshold), the interaction may be deemed to be high risk. In such situation, the access control server 120 may require additional data from the user associated with the user device 102 in order to be authenticated for the interaction. For example, when the score is determined to be high risk, the process may continue to step 5 for further authentication processes (e.g., a challenge process).

In some embodiments, the analysis using the data received in the authentication request message may be additionally, or alternatively, performed by the directory server 118 on behalf of the access control server 120. In some embodiments, the score determined by the analysis by the directory server 118 may then be sent to the access control server 120 for further authentication operations.

At step 4, after the access control server 120 decides to perform additional authentication processes, the access control server 120 may initiate a challenge process with the user. The access control server 120 may generate and send a challenge request message to the user device 102. The challenge request message may request that the user associated with the user device 102 provide a pre-established secure data element (e.g., password, token, or biometric data). The challenge request message may be presented to the user on the display of the user device 102 as a web interface sent across a communications network (e.g., Internet), or may be sent to the consumer via other types of communications (e.g., SMS messaging, email messaging).

In some embodiments, the challenge request message may be sent directly from the access control server 120 to the user device 102 (e.g., via the path marked by the letter "A"). In other embodiments, the challenge request message may be sent to the user device 102 through the directory server 118 and/or the server computer 104. The challenge request message may be sent through the secure connection established by an application operating on the user device 102, which is communicating with the server computer 104.

After receiving the challenge request message, the user device 102 can present the challenge request message to the user. The user can interact with the user device 102 to input authentication data (e.g., a biometric, a one-time password, a password, etc.).

At step 5, the user device 102 returns a challenge response message to the access control server 120 (e.g., via the communication path marked by the letter "A"). The challenge response message may include the secure data element (e.g., authentication data) requested by the access control server 120. In some embodiments, the challenge response message may be sent directly to the access control server 120 from the user device 102. In other embodiments, the challenge response message may be sent from the user device 102 to the access control server 120 through the server computer 104 and/or the directory server 118.

The access control server 120 may evaluate the received secure data element with respect to a previously registered secure data element stored by, or accessible to, the access control server 120. When the received secure data element and the stored secure data element match or are within an expected range, the access control server 120 can generate an authentication indicator that indicates that the user and/or the user device 102 is authentic.

In some embodiments, steps 4 and 5 may be repeated until either a predetermined number of times the secure data element can be requested from the user device 102 is exceeded, the access control server 120 successfully authenticates the user, or the authentication is determined to be unsuccessful. For example, when the received secure data element and the stored secure data element do not match or are not within an expected range, the access control server 120 generates and transmits an authentication response message to the server computer 104 via the directory server 118 that indicates that authentication has failed. Receipt of an authentication response message indicating that the authentication has failed may cause the server computer 104 to transmit an interaction response message to the user device 102 indicating that the interaction has failed and further processing by the resource provider computer may not be performed.

At step 6, after the access control server 120 determines that the user and/or the user device 102 is authentic, the access control server 120 generates and sends an authentication response message comprising the authentication indicator to the directory server 118.

At step 7, after receiving the authentication response message, the directory server 118 can provide the authentication response message to the server computer 104.

At step 8, after receiving the authentication response message, the server computer 104 can evaluate the authentication indicator included in the authentication response message. The server computer 104 can determine whether or not to continue with the interaction based on the authentication indicator. For example, if the authentication indicator indicates that the user and/or the user device 102 is not authentic, then the server computer 104 can terminate the interaction with the user device 102. If the authentication indicator indicates that the user and/or the user device 102 is authentic, then the serve computer 104 can process the interaction. The server computer 104 can process the interaction as indicated by the user device 102 during step 1.

As a first illustrative example, the interaction data can include a user public key that is a public address with the cryptocurrency blockchain 114. The server computer 104 can generate a cryptocurrency transaction to include in the cryptocurrency blockchain 114. The cryptocurrency transaction can indicate that the amount of cryptocurrency is to be provided from the user address to a resource provider address of the server computer 104. The server computer 104 can provide the cryptocurrency transaction to the cryptocurrency network that maintains the cryptocurrency blockchain 114 for processing. In some cases, the server computer 104 may request the user device 102 to sign the cryptocurrency transaction or data included therein which the cryptocurrency blockchain network maintaining the cryptocurrency blockchain 114 can verify using the user public key.

The cryptocurrency network operating the cryptocurrency blockchain 114 can process the cryptocurrency transaction. The cryptocurrency network operating the cryptocurrency blockchain 114 can verify the parties and the amounts in the cryptocurrency transaction. For example, the cryptocurrency network operating the cryptocurrency blockchain 114 can verify that the user address includes enough funds to perform the transaction. The cryptocurrency network operating the cryptocurrency blockchain 114 can add the cryptocurrency transaction to a block of the blockchain if the cryptocurrency transaction is valid.

As a second illustrative example, the interaction data can include a user public key that is a public address associated with the cryptocurrency blockchain 114 as well as a primary account number that indicates an account maintained by the authorizing entity computer 122. The interaction data can indicate that the cryptocurrency associated with the public address is to be the primary source of funds, while fiat currency in a primary account associated with the primary account number is to be a secondary source of funds.

As such, the server computer 104 can determine that the transaction for the item is associated with an amount and that the amount of cryptocurrency owned by the user, as indicated in the user public key, is less than the amount of the item. The server computer 104 can then determine an amount of alternative currency needed to complete the transaction for the item for the amount. The alternative currency can be another cryptocurrency or a fiat currency. In this example, the alternative currency is a fiat currency in an account indicated by the primary account number and maintained by the authorizing entity computer 122.

In some embodiments, the server computer 104 can generate an authorization request message comprising the primary account number and a second amount that is the difference between the amount of the item and the amount of funds held by the user public key. In some embodiments, the authorization request message can include the original interaction data. The authorization request message can also include the authentication indicator.

The server computer 104 can transmit the authorization request message to the network processing computer 116. In some embodiments, the server computer 104 can provide the authorization request message to a transport computer (not shown), which can then provide the authorization request message to the network processing computer 116. The network processing computer 116 can provide the authorization request message to the authorizing entity computer 122.

After receiving the authorization request message, the authorizing entity computer 122 can determine whether or not to authorize the interaction. The authorizing entity computer 122 can determine whether or not to authorize the interaction based on the interaction data. In some embodiments, the authorizing entity computer 122 can determine that the interaction is authorized based at least upon the authentication indicator in the interaction data. The authorizing entity computer 122 can generate an authorization response message comprising an indication of whether or not the interaction is authorized. The authorizing entity computer 122 can provide the authorization response message to the network processing computer 116.

After receiving the authorization response message, the network processing computer 116 can provide the authorization response message to the server computer 104. In some embodiments, the authorization response message can be provided to the server computer 104 via a transport computer.

After receiving the authorization response message, the server computer 104 can receive the funds in fiat currency from the authorizing entity computer 122 via the network processing computer 116 and into an account held by a transport computer (e.g., an acquirer computer) in a settlement process. Thus, the resource provider operating the server computer 104 can be paid for the resource with multiple different types of currency.

In other embodiments, the server computer 104 can continue to process the interaction and can generate a cryptocurrency transaction to include in the cryptocurrency blockchain 114 as described above for the remaining balance of the amount.

The server computer 104 can process the cryptocurrency transaction prior to, during, or after processing the primary account number based transaction.

At step 9, after processing the interaction, the server computer 104 can notify the user device 102 of the outcome of the interaction. For example, the server computer 104 can generate an interaction response message that indicates whether or not the interaction was successful. The server computer 104 can provide the interaction response message to the user device 102.

Figure 5:
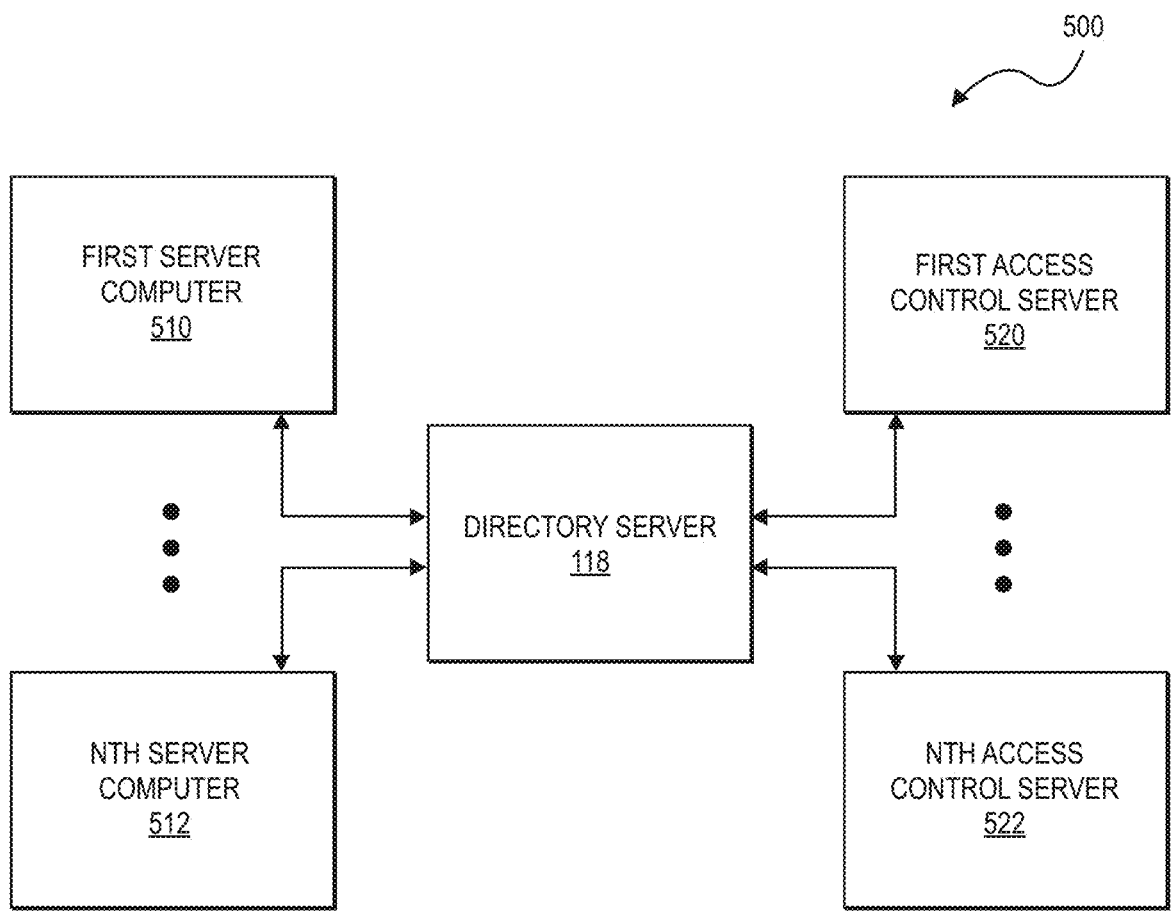
FIG. 5 shows a block diagram illustrating a message routing system according to embodiments.

FIG. 5 shows a block diagram illustrating a message routing system according to embodiments. FIG. 5 illustrates a system 500 comprising the directory server 118, a first server computer 510, an Nth server computer 512, a first access control server 520, and an Nth access control server 522.

The directory server 118 can be in operative communication with a plurality of server computers including the first server computer 510 and the Nth server computer 512. The directory server 118 can also be in operative communication with a plurality of access control servers including the first access control server 520 and the Nth access control server 522.

The directory server 118 contains a routing table that contains mappings between credential identifier portions and access control server addresses. The credential identifier portions can be a bank identification number (BIN) or other entity identification number. Access control server addresses can include an IP address of the access control server.

During authentication (e.g., at step 3 as illustrated in FIG. 1), a server computer of the plurality of server computers can provide an authentication request message to the directory server 118. Each server computer of the plurality of server computers can send the authentication request message to the directory server 118 without needing to know which access control server is the final destination of the authentication request message.

After receiving the authentication request message, the directory server 118 can identify a credential identifier portion from a credential included in the authentication request message. The credential identifier portion can a part of, or derived from, the credential. For example, the credential identifier portion can be the first 4 to 6 digits of the credential.

The directory server 118 can utilize the credential identifier portion and the routing table to determine an access control server address that corresponds with the credential identifier portion. For example, the routing table can link together credential identifier portions and access control server addresses. The directory server 118 can search, or otherwise query, the routing table for the identified credential identifier portion to obtain the access control server address. For example, the access control server address can be the address of the first access control server 520.

After obtaining the access control server address, the directory server 118 can establish a communication channel with the access control server identified by the access control server address. For example, the directory server 118 can establish a TCP/IP or other suitably secure communication channel with the first access control server 520 using the access control server address. The directory server 118 can then provide the authentication request message to the first access control server 520 via the communication channel.

In some embodiments, prior to performing authentication, a user and/or the user device 102 can be enrolled with the directory server 118 and/or the access control server 120. For example, a user of the user device 102 can enroll in the authentication system through an authorizing entity associated with the user (e.g., a bank) or can be enrolled by the authorizing entity. During enrollment, the directory server 118 can receive a credential identifier portion and an address of an access control server if a routing table has not yet been established. The authorizing entity computer 122 can provide data to the access control server 120 to enroll the user and/or the user device 102. The authorizing entity computer 122 can provide a credential of the user and authentication information of the user to the access control server 120. For example, the authorizing entity computer 122 can provide the user's payment credential and the user's phone number and email address to the access control server 120, such that the access control server 120 can, during an interaction, contact the user via the user's authentication information when the payment credential is identified.

Figure 6:
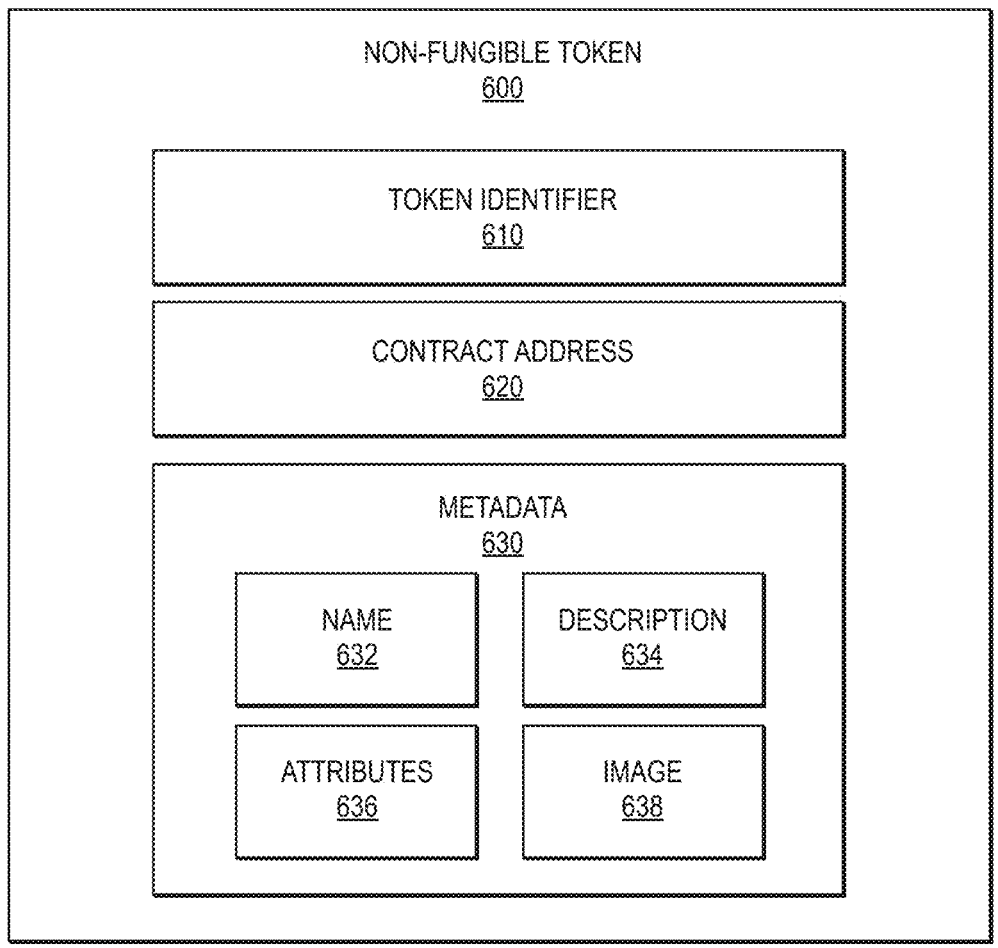
FIG. 6 shows a block diagram illustrating a non-fungible token according to embodiments.

FIG. 6 shows a block diagram illustrating a non-fungible token according to embodiments. FIG. 6 illustrates an example non-fungible token 600 and data included therein. The non-fungible token 600 includes a token identifier 610, a contract address 620, and metadata 630.

The non-fungible token 600 is identified by the token identifier 610. The token identifier 610 can be a unique uint256 value, which is included inside the smart contract (e.g., ERC-721) for the non-fungible token referenced by the contract address 620. The token identifier 610 is a static value for the life of the contract as indicated in the association smart contract. Each non-fungible token 600 for a certain smart contract should have a different token identifier 610.

The contract address 620 can be an address that identifies a smart contract on a blockchain that created, maintains, and transfers the non-fungible token 600. The token identifier 610 and the contract address 620, as a pair, are globally unique and can act as a fully qualified identifier for a specific asset on a blockchain.

Ownership of the non-fungible token 600 can be managed through the token identifier 610 and the metadata 630 that no other token can replicate. Non-fungible tokens are minted through smart contracts that assign ownership and manage the transferability of the non-fungible tokens. When a computer creates or mints a non-fungible token, the computer executes code stored in smart contracts that conform to different standards, such as ERC-721. This information is added to the non-fungible token blockchain where the non-fungible token 600 is being managed.

Ownership of the non-fungible token 600 can be proven. Proving that an entity owns the non-fungible token 600 can be similar to proving that an entity owns a cryptocurrency in their account. For example, when an entity purchases the non-fungible token 600, the ownership of the token identifier 610 is transferred to a digital wallet of the entity via the entity's public address (e.g., public key). The private key corresponding to the public key can be proof-of-ownership of the non-fungible token 600. A signature created by the private key corresponding to the public key, to which the non-fungible token 600 is assigned, can act as proof that the entity supplying the signature owns the non-fungible token 600.

The metadata 630 for the non-fungible token 600 can be implemented in an on-chain framework or in an off-chain framework. In the on-chain framework, which is illustrated in FIG. 6, the metadata 630 is included in the non-fungible token 600 itself and stored on the blockchain. In the off-chain framework, the metadata 630 included in the non-fungible token 600 can be a URI that links to a location where the metadata content is stored. For example, off-chain metadata can be stored in any long term database or network such as the InterPlanetary File System, which is a protocol, hypermedia, and file sharing peer-to-peer network for storing and sharing data in a distributed file system.

The metadata 630 can include a name 632, a description 634, attributes 636, an image 638, and/or other data that describes the non-fungible token 600 (e.g., animation URLs, external URLs, video URLs, etc.). The name 632 can be a name given to the non-fungible token 600 (e.g., by the creator of the non-fungible token 600). The description 634 can be a description written about the non-fungible token 600 (e.g., by the creator of the non-fungible token 600). The attributes 636 can include data that relates to how the non-fungible token 600 was created in, for example, a procedural content generation process. The attributes 636 can include selected attributes for the non-fungible token 600 such as character color, character birthday, base shapes, eye color, etc. For example, the attributes 636 can include data relating to how the image 638 of the non-fungible token 600 was generated. The image 638 can include a graphic created by the creator of the non-fungible token 600.

Figure 7:
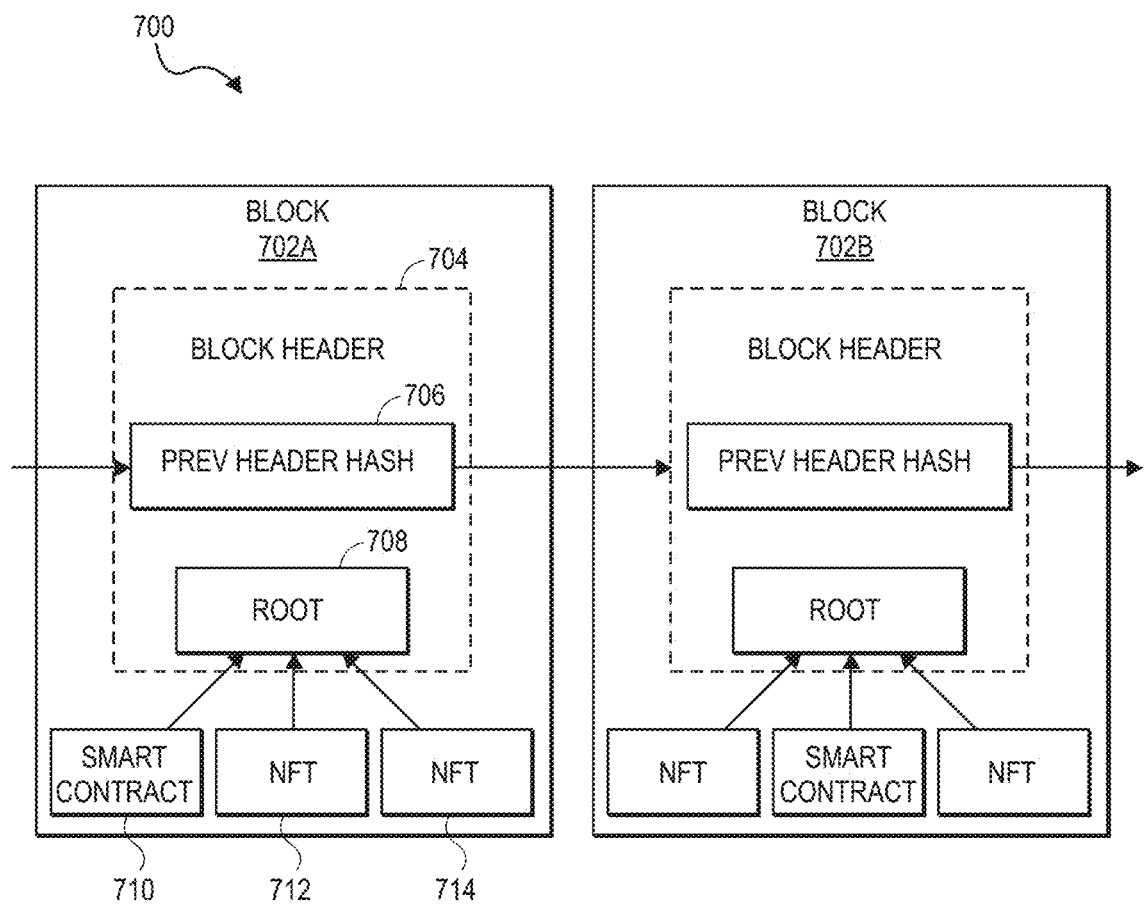
FIG. 7 shows a block diagram illustrating a first blockchain according to embodiments.

FIG. 7 shows a block diagram illustrating a first blockchain according to embodiments. A blockchain 700 can include a list of blocks of non-fungible tokens, the blocks are cryptographically chained together as depicted in FIG. 7. A block is created by a computationally intensive process called proof-of-work in which valid blocks need to demonstrate a sufficient "difficulty" (e.g., sufficient computation power to create on average). In some embodiments, the first blockchain can utilize a proof-of-stake process rather than a proof-of-work process. If there are more than one available chains of blocks, then network participants (e.g., nodes) need to download all blocks in all chains and follow the chain which has the highest total difficulty. This mechanism guarantees that, eventually, the network will agree on a single and valid chain.

FIG. 7 shows an example blockchain format. However, it is understood that other formats and data structures can be utilized. The blockchain 700 can comprise a plurality of blocks, for example, block 702A and block 702B. Each block can comprise a block header, for example, block 702A comprises block header 704.

The block header 704 can include multiple data elements, such as a previous header hash 706 and a Merkle root 708. The previous header hash 706 can be a hash of the previous block's header. The Merkle root 708 can be a root of a Merkle tree, which is a tree in which every leaf node is labelled with the hash of a data block, for example, data in the smart contract 710 and the non-fungible tokens 712 and 714. Each leaf of the Merkle tree can represent one of the smart contracts 710 or the non-fungible tokens 712 or 714.

Figure 8:
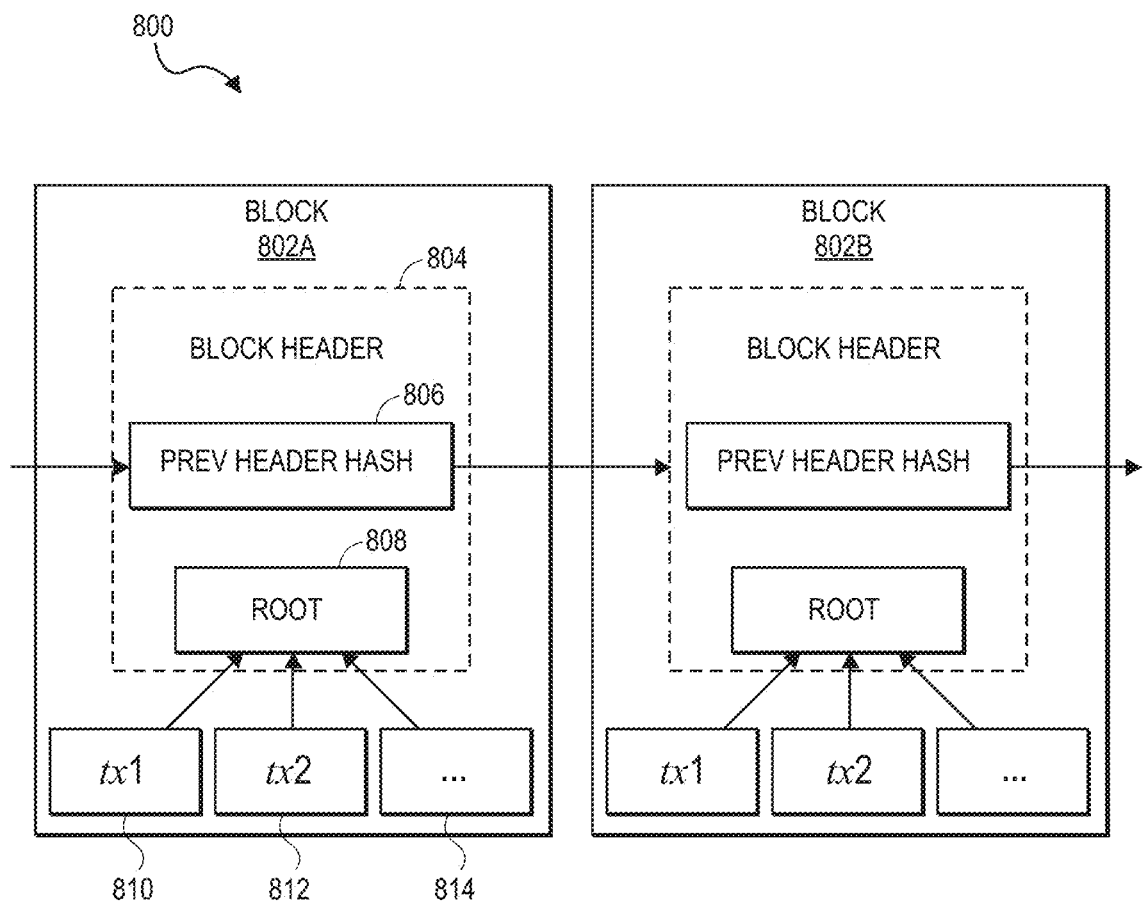
FIG. 8 shows a block diagram illustrating a second blockchain according to embodiments.

FIG. 8 shows a block diagram illustrating a second blockchain, which can be a cryptocurrency blockchain, according to embodiments. FIG. 8 shows an example blockchain format. However, it is understood that other formats and data structures can be utilized. A blockchain 800 can comprise a plurality of blocks, for example, block 802A and block 802B. Each block can comprise a block header, e.g., block 802A comprises block header 804. The block header

804 can include multiple data elements, such as a previous header hash 806 and a Merkle root 808. The previous header hash 806 can be a hash of the previous block's header. The Merkle root 808 can be a root of a Merkle tree, which is a tree in which every leaf node is labelled with the hash of a data block, for example, data in a transaction 810-814. Each leaf of the Merkle tree can represent one of the transactions 810-814.

Figure 9:
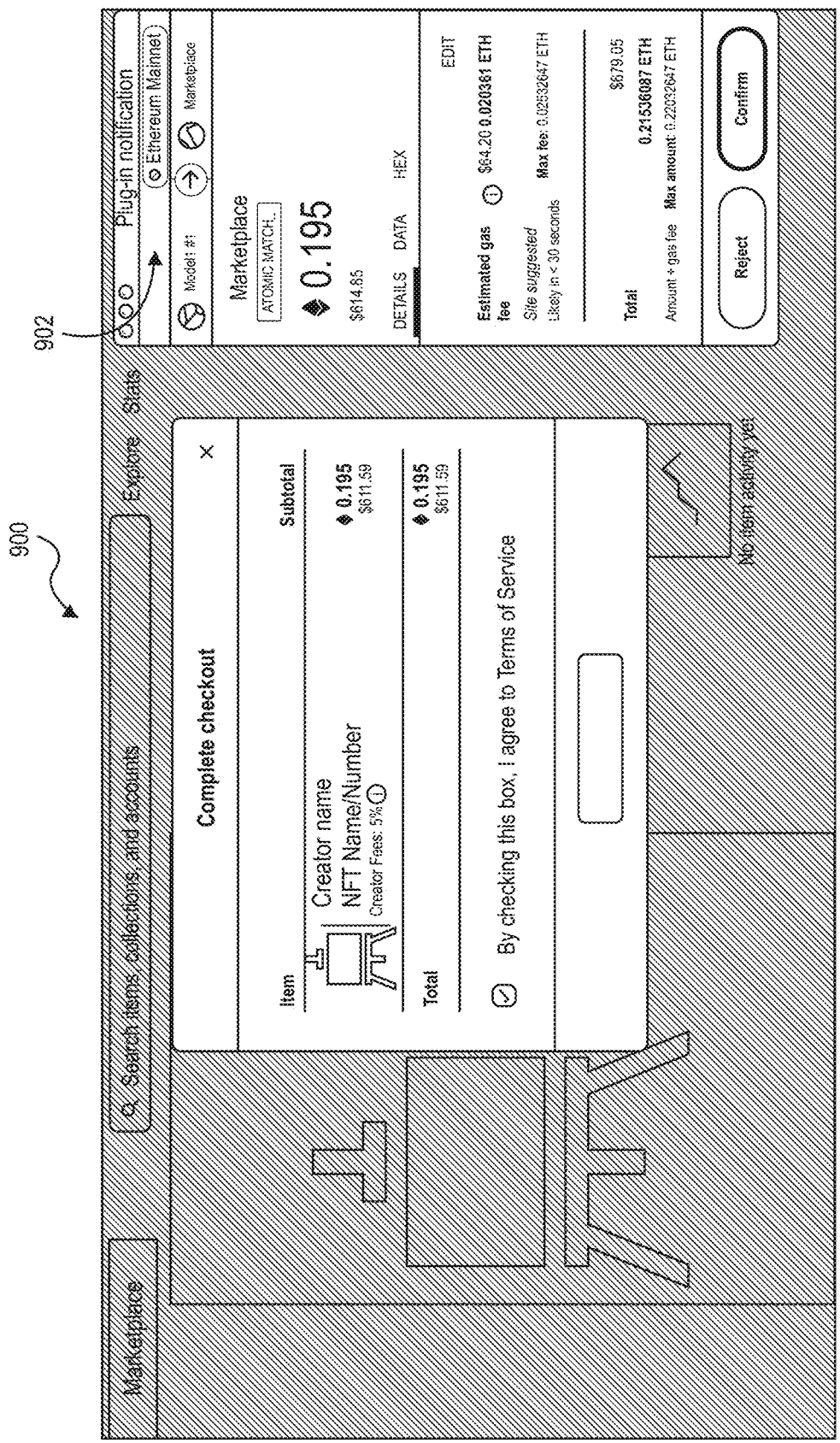
FIG. 9 shows a UI diagram illustrating a user interface presented to a user during an interaction process according to embodiments.

FIG. 9 shows a UI diagram illustrating a user interface presented to a user during an interaction process according to embodiments. A user of the user device 102 can interact with a website provided by the non-fungible token provider computer 106. The website can allow the user to select an option to perform an interaction, such as obtaining an NFT.

FIG. 9 includes a UI 900 that can be presented to the user via the user device 102. The UI 900 shows a checkout screen where the user can select to obtain an NFT. Upon selecting to proceed with the interaction (e.g., checkout), the user can be presented with a notification. The notification can be the plug-in notification 902. The plug-in notification 902 can be created by the server computer plug-in installed on the user device 102. The plug-in notification 902 can allow the server computer 104 to communicate with the user device 102. The plug-in notification 902 can illustrate details relating to the interaction initiated by the user of the user device 102. The plug-in notification 902 can include a confirmation button that can allow the user to select to proceed with the interaction.

When the user of the user device 102 selects to confirm the interaction, an authentication and authorization process can be performed, as described herein. For example, the server computer 104 can communicate with the directory server 118 and the access control server 120 to authenticate the user and/or the user device 102. In some embodiments, the access control server 120 can send a one-time password to the user device 102 via SMS or other form of communication. The access control server 120 can prompt the user of the user device 102 to input the one-time password into an input field provided by the server computer plug-in as presented by the website hosted by the non-fungible token provider computer 106. The input field is illustrated in FIG. 10.

Figure 10:
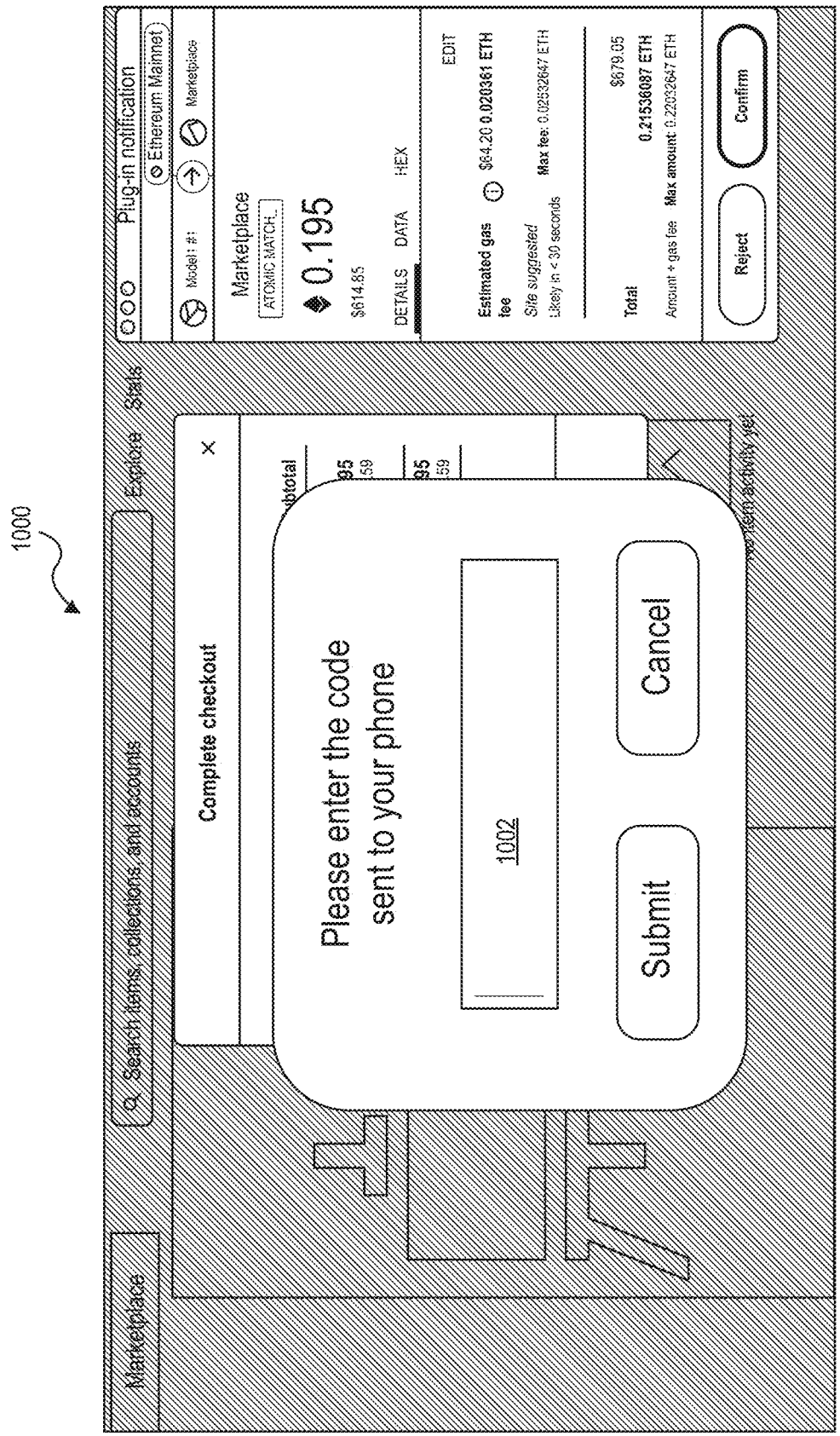
FIG. 10 shows a UI diagram illustrating a user interface presented to a user during an authentication process according to embodiments.

FIG. 10 shows a UI diagram illustrating a user interface presented to a user during an authentication process according to embodiments. FIG. 10 includes a UI 1000 that shows an authentication screen where the user can be authenticated. The example illustrated in the UI 1000 is an authentication screen where the user is prompted to input a one-time password into an input field 1002.

The one-time password can be provided by the access control server 120 to the user device 102. The user can input the one-time password into the input field 1002. The server computer plug-in can receive the one-time password from the user of the user device 102 and then provide the one-time password to the access control server 120 via the directory server 118. The access control server 120 can then determine whether or not the user of the user device 102 is authentic based on the one-time password, as described herein.

Embodiments of the disclosure have a number of advantages. Current cryptocurrency frameworks allow users perform transactions in decentralized networks. However, these cryptocurrency frameworks lack flexibility in that a single transaction can utilize a single type of cryptocurrency. Embodiments provide for a framework in which a user can initiate a transaction where if the user does not have enough cryptocurrency funds, additional funds (cryptocurrency or fiat) can be obtained from a secondary source.

Embodiments further provide for a technical advantage of authenticating a user during a transaction in a decentralized transaction framework. Currently, a receiver of cryptocurrency funds may not know if the funds that they are receiving in a transaction are from a legitimate source or not. A user's account can potentially be stolen and the receiver of cryptocurrency funds cannot tell if the provider of the funds is legitimate and/or authentic. Further, in some embodiments, part of an existing authentication infrastructure can be used to authenticate users for cryptocurrency transactions. In particular, access control servers can authenticate users. The access control servers are operated by authorizing entities such as issuers, which have accounts of the users and are trusted by the users. Embodiments of the invention can leverage this trust so that the users can securely conduct cryptocurrency transactions, even though the authorizing entities do not conduct transactions or have accounts with cryptocurrencies.

Embodiments further provide for additional advantages. For example, a user may only need to utilize the authentication process described herein to perform interactions with other entities in a decentralized framework. Users can rely on the trust provided by the access control system and its trusted communication path. Furthermore, embodiments provide for the advantage of allowing a user to retain access to their digital wallet even if they lose their user device. For example, currently, if a user loses their user device, which stores their user public key and user private key, then they will lose access to their digital wallet and any digital assets associated with the public/private key pair. Embodiments allow for the user to easily reauthenticate withe the system after losing their user device to retain access to their digital wallet.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method performed using a server computer, the server computer comprising a first profile of a user, the first profile containing a mapping between a cryptocurrency user identifier for cryptocurrency and a credential associated with an account, the method comprising:
   receiving, by the server computer, a request comprising the cryptocurrency user identifier from the user to obtain a resource in a transaction using a cryptocurrency;
   determining, by the server computer, that the transaction is to be conducted using the cryptocurrency;
   determining, by an authentication processing module in the server computer, that the server computer stores the first profile;
   determining, by the authentication processing module in the server computer, the credential associated with the account using the first profile of the user and the cryptocurrency user identifier;
   based on determining that the server computer stores the first profile, initiating, by the authentication processing module in the server computer, an authentication request message comprising the credential associated with the account to an access control server via a directory server, wherein the access control server authenticates the user and generates an authentication indicator;
   receiving, by the server computer from the access control server, an authentication response comprising the authentication indicator;
   evaluating, by the server computer, the authentication indicator; and
   responsive to evaluating the authentication indicator, processing, by the server computer, the transaction using the cryptocurrency,
   wherein the processing of the transaction using the cryptocurrency further comprises:
   generating a transfer message that requests transfer of an amount from the user of a user device to a resource provider of the resource, wherein the transfer message includes a user public key, a resource provider public key, the amount, and a signature formed from a user private key corresponding to the user public key; and
   providing the transfer message to a blockchain network, wherein the blockchain network includes the transfer into a block of a blockchain maintained by the blockchain network.

2. The method of claim 1, wherein the access control server contains a second profile of the user, the second profile containing a mapping between the credential and authentication information of the user or the user device of the user.

3. The method of claim 1, further comprising:
   determining, by the server computer, that the transaction for the resource is associated with the amount, and determining that an amount of cryptocurrency owned by the user is less than the amount of the resource, wherein the server computer further determines an amount of alternative currency needed to complete the transaction for the resource for the amount, and processes the transaction using the cryptocurrency.

4. The method of claim 3, wherein the alternative currency is another cryptocurrency or fiat currency.

5. The method of claim 3, wherein the first profile of the user contains user data and data regarding the cryptocurrency and the alternative currency, and rules relating to the use of the cryptocurrency and the alternative currency.

6. The method of claim 1, further comprising:
   determining, by the server computer, that the transaction for the resource is associated with the amount, and determining that an amount of cryptocurrency owned by the user is less than the amount of the resource, wherein the server computer further contacts a cryptocurrency exchange to obtain an amount of the cryptocurrency sufficient to obtain the resource.

7. The method of claim 1, wherein the server computer is a wallet server computer.

8. The method of claim 1, wherein the server computer is a resource provider computer.

9. The method of claim 1, wherein the resource is a non-fungible token, and wherein the method further comprises:
   generating, by the server computer, another transfer message that requests transfer of the non-fungible token to the user of the user device, wherein the another transfer message includes the user public key and a reference to at least one function in a smart contract referenced by the non-fungible token; and
   providing, by the server computer, the another transfer message to a non-fungible token blockchain network maintaining a non-fungible token blockchain, wherein the non-fungible token blockchain network includes the transfer into a block of the non-fungible token blockchain and executes the at least one function in the smart contract, wherein the execution of the at least one function in the smart contract transfers ownership of the non-fungible token to the user public key.

10. The method of claim 9, wherein the transaction for the resource is associated with the amount, wherein the transfer message includes a proof.

11. The method of claim 1, wherein the request is received from the user device of the user, the user device containing an application programmed to maintain user public keys, user private keys, and cryptocurrencies and non-fungible tokens associated with the user public keys.

12. The method of claim 1, wherein the directory server contains a routing table that contains mappings between credential identifier portions, and access control server addresses.

13. The method of claim 1, wherein receiving the request from the user further comprises:
   receiving, by the server computer, the request from the user device accessing a webpage hosted by a non-fungible token provider computer via a browser installed with a server computer plug-in, wherein the request is provided from the user device to the server computer via the server computer plug-in.

14. A server computer comprising:

a processor; and a computer-readable medium coupled to the processor, the computer-readable medium comprising an authentication processing module, and a first profile of a user, the first profile containing a mapping between a cryptocurrency user identifier for cryptocurrency and a credential associated with an account, and code executable by the processor for implementing a method comprising:

receiving a request from the user to obtain a resource in a transaction using a cryptocurrency;

determining that the transaction is to be conducted using the cryptocurrency;

determining, by the authentication processing module, that the server computer stores the first profile;

determining, by the authentication processing module, the credential associated with the account using the first profile of the user and the cryptocurrency user identifier;

based on determining that the server computer stores the first profile, initiating, by the authentication processing module, an authentication request message to an access control server via a directory server, wherein the access control server authenticates the user and generates an authentication indicator;

receiving, from the access control server, an authentication response comprising the authentication indicator;

evaluating the authentication indicator; and responsive to evaluating the authentication indicator, processing the transaction using the cryptocurrency, wherein the processing of the transaction using the cryptocurrency further comprises:

generating a transfer message that requests transfer of an amount from the user of a user device to a resource provider of the resource, wherein the transfer message includes a user public key, a resource provider public key, the amount, and a signature formed from a user private key corresponding to the user public key; and providing the transfer message to a blockchain network, wherein the blockchain network includes the transfer into a block of a blockchain maintained by the blockchain network.

15. The server computer of claim 14, wherein the server computer is a wallet server computer or a resource provider computer.

16. The server computer of claim 14, wherein the credential is an account number or a token representing the account number.

17. The server computer of claim 14, wherein processing the transaction using the cryptocurrency further comprises:

determining that the transaction for the resource is associated with the amount;

determining that an amount of cryptocurrency owned by the user is less than the amount of the resource resulting in a difference amount of additional cryptocurrency;

initiating a second interaction to obtain additional cryptocurrency for the difference amount with a cryptocurrency exchange;

generating an authorization request message for the second interaction including the difference amount and the credential associated with the user device of the user;

providing the authorization request message to an authorizing entity computer via a network processing computer for authorization;

receiving an authorization response message from the authorizing entity computer via the network processing computer comprising an indication of whether or not the second interaction is authorized; and processing the transaction using the cryptocurrency and the additional cryptocurrency.

18. The server computer of claim 14, wherein the resource is a good or service.

19. The server computer of claim 17, wherein the server computer is a wallet server computer.

20. The server computer of claim 17, wherein the server computer is a merchant server computer.

* * * * *